United States Patent
Zhang et al.

(10) Patent No.: US 12,539,867 B1
(45) Date of Patent: Feb. 3, 2026

(54) SIMULATION FOR VALIDATION INCLUDING LATENCY INJECTION

(71) Applicant: Nuro, Inc., Mountain View, CA (US)

(72) Inventors: Xiaojie Zhang, Saratoga, CA (US); Xiyue Wang, San Jose, CA (US); Ziren Lin, Sunnyvale, CA (US); Anant Desai, Mountain View, CA (US); Hanhong Gao, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 288 days.

(21) Appl. No.: 18/082,106

(22) Filed: Dec. 15, 2022

Related U.S. Application Data

(60) Provisional application No. 63/298,131, filed on Jan. 10, 2022.

(51) Int. Cl.
| | |
|---|---|
| *B60W 50/06* | (2006.01) |
| *B60W 60/00* | (2020.01) |
| *G06F 30/20* | (2020.01) |
| *H04L 43/0852* | (2022.01) |

(52) U.S. Cl.
CPC ........ *B60W 50/06* (2013.01); *B60W 60/0015* (2020.02); *G06F 30/20* (2020.01); *B60W 2556/45* (2020.02); *H04L 43/0852* (2013.01)

(58) Field of Classification Search
CPC .. B60W 50/00; B60W 60/00; B60W 2556/45; G05D 1/00; G06F 30/20; H04L 43/0852
See application file for complete search history.

(56) References Cited

U.S. PATENT DOCUMENTS

| | | | |
|---|---|---|---|
| 11,577,741 B1* | 2/2023 | Reschka | B60W 50/045 |
| 11,593,540 B1* | 2/2023 | Popovici | G06F 9/455 |
| 2018/0348750 A1* | 12/2018 | Lupa | G05D 1/0038 |
| 2020/0201335 A1* | 6/2020 | Somers | B60W 50/035 |

(Continued)

OTHER PUBLICATIONS

Schramm, Translation of DE 102008027509 A1, Dec. 31, 2009 (Year: 2009).*

(Continued)

*Primary Examiner* — Aniss Chad
*Assistant Examiner* — Elizabeth J Slowik
(74) *Attorney, Agent, or Firm* — Edell, Shapiro & Finnan, LLC

(57) ABSTRACT

According to one aspect, methods for simulating operations of an autonomous vehicle in which latencies associated between various components of the autonomous vehicle are injected into a simulation for validating an autonomous driving system (autonomy system and/or simulation system) for driving a vehicle are provided. A computing device obtains simulation data that represents an environment in which a vehicle is driven for a predetermined time using an autonomous driving system. The computing device determines at least one latency amount associated with operating the vehicle using the autonomous driving system, based on characteristics of the simulation data and injects the at least one latency amount into the simulation data, forming a simulation scenario. The computing device validates the autonomous driving system for driving the vehicle using the simulation scenario.

20 Claims, 17 Drawing Sheets

(56) References Cited

U.S. PATENT DOCUMENTS

| | | | | |
|---|---|---|---|---|
| 2021/0049243 A1* | 2/2021 | Venkatadri | ............... | G06N 5/04 |
| 2021/0157325 A1* | 5/2021 | Beller | ................. | B60W 60/001 |
| 2021/0157882 A1* | 5/2021 | Liu | ...................... | G05D 1/0088 |
| 2021/0325198 A1* | 10/2021 | Chen | ..................... | H04W 4/029 |
| 2022/0111860 A1* | 4/2022 | Brahma | ............... | G06V 10/764 |
| 2022/0315046 A1* | 10/2022 | Jiang | .................... | B60W 60/00 |
| 2023/0174101 A1* | 6/2023 | Collin | ..................... | H04L 67/12 |
| | | | | 701/23 |

OTHER PUBLICATIONS

Benedikt Danquah, "Statistical Validation Framework for Automotive Vehicle Simulations Using Uncertainty Learning," MDPI, Applied Sciences, https://doi.org/10.3390/app11051983, Feb. 24, 2021, 22 pages.

Cha Lee, et al., "The Role of Latency in the Validity of AR Simulation," IEEE Virtual Reality Conference, Nov. 2010, 8 pages.

* cited by examiner

SIMULATION FOR VALIDATION INCLUDING LATENCY INJECTION

CROSS REFERENCE TO RELATED APPLICATION

This application claims priority under 35 U.S.C. § 119 (e) to U.S. Provisional Application No. 63/298,131, filed Jan. 10, 2022, entitled "Simulation for Validation including Latency Injection," the entirety of which is incorporated herein by reference.

TECHNICAL FIELD

The disclosure relates to autonomous vehicles. More particularly, the disclosure relates to assessing readiness for deployment and performance of autonomous systems.

BACKGROUND

Within autonomous vehicles, latency, or a communications delay or lag, may be associated with different modules of the vehicles. For example, there may be time delays as data is provided from one component of an autonomous vehicle to another component of the autonomous vehicle. Such time delays may, in some instances, affect the performance of the vehicle.

Autonomous vehicles may be controlled by teleoperations systems such that the vehicles may be remotely monitored and/or remotely operated under the command of humans, i.e., a human driver may effectively remotely drive a vehicle using a teleoperations system. Communications between an autonomous vehicle and a teleoperations are often subjected to latency. If a network that supports an autonomous vehicle and a teleoperations system is characterized by a relatively large amount of latency, e.g., time delay, the safe operation of the autonomous vehicle by a teleoperations system may be compromised.

DESCRIPTION OF EXAMPLE EMBODIMENTS

Overview

Figure 1:
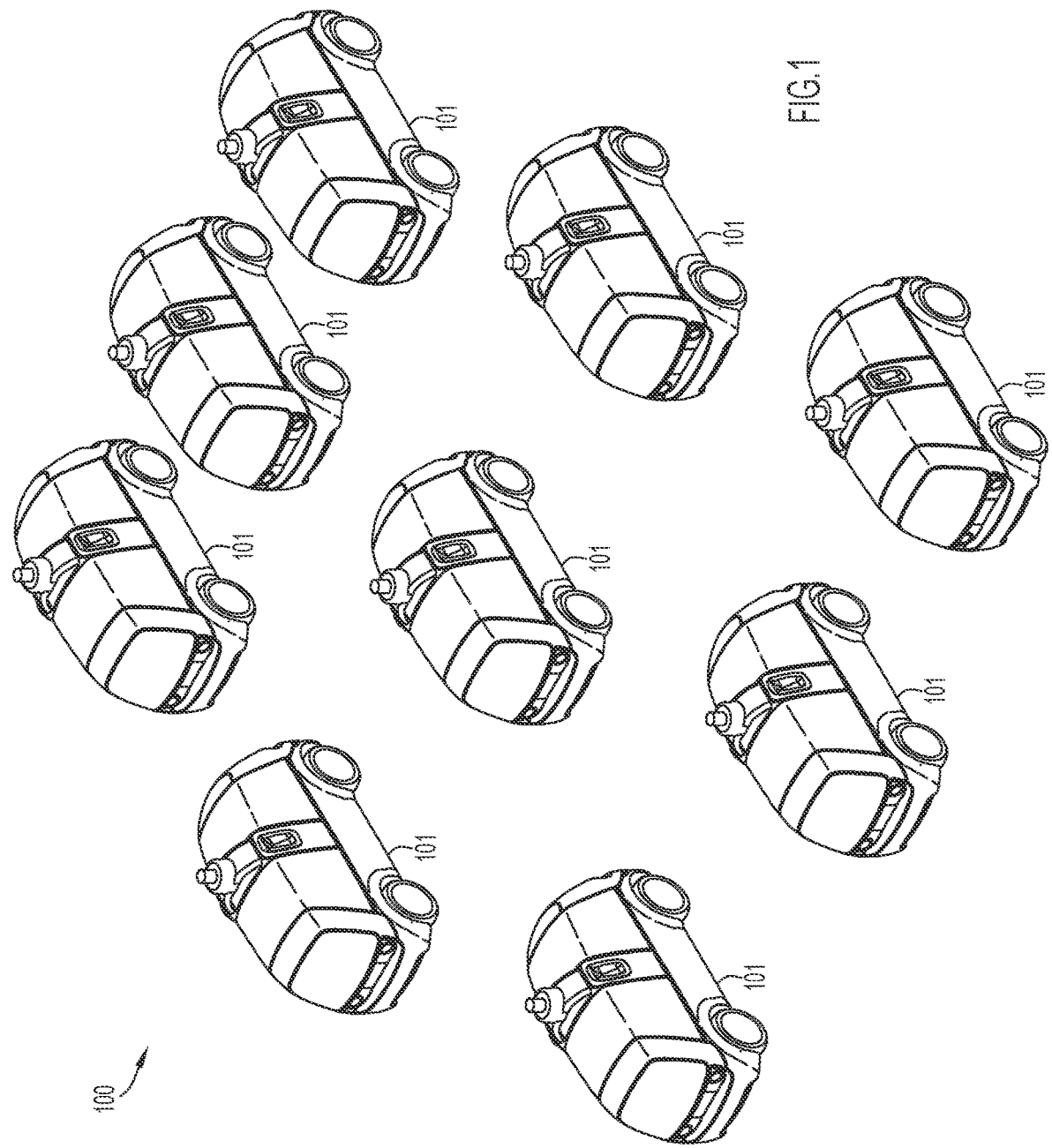
FIG. 1 is a diagram of an autonomous vehicle fleet in which an autonomy system for driving an autonomous vehicle in the fleet is validated using a simulation scenario that accounts for latencies associated with operating the vehicle using the autonomous driving system, according to an example embodiment.

Methods are provided for simulating operations of an autonomous vehicle in which latencies associated between various components of the autonomous vehicle are injected into a simulation for validating an autonomous driving system (autonomy system and/or simulation system) for driving a vehicle.

In one embodiment, a computing device obtains simulation data that represents an environment in which a vehicle is driven for a predetermined time using an autonomous driving system. The computing device determines at least one latency amount associated with operating the vehicle using the autonomous driving system, based on characteristics of the simulation data and injects the at least one latency amount into the simulation data, forming a simulation scenario. The computing device validates the autonomous driving system for driving the vehicle using the simulation scenario.

Example Embodiments

An autonomous driving system may be a system configured to autonomously control and/or drive the autonomous vehicle (vehicle). The autonomous driving system includes an autonomy system that may be incorporated inside the autonomous vehicle. The autonomy system may include a sensor system configured to sense an environment surrounding the autonomous vehicle and a controller and a processor, coupled to the sensor system, configured to control operation of the autonomous vehicle and to perform various operations.

In one example, the autonomous driving system may be a simulation system that tests control of the autonomous vehicle in a simulation or virtual environment. That is, simulation systems may generally be used to validate autonomy systems. A simulation system may simulate the behavior of an autonomous driving system across a multitude of different real-world scenes, scenarios, and/or situations (i.e., run a simulation). That is, a simulation system allows different autonomy-related algorithms to be tested with different real-world driving scenes or scenarios to substantially ensure that once the autonomous driving system is deployed on a vehicle, the vehicle may operate safely and reliably.

Within an autonomous vehicle, different systems may exchange data. For example, a sensor system may provide data to a navigation system. When data is exchanged between systems of modules of a vehicle, there may be latency or time delays associated. That is, the exchange of data is not instantaneous. At each stage or step associated with the operation of an autonomous vehicle, as for example at a perception stage and at a planning stage, latency may be such that a time delay increases. In some situations, when there is a relatively significant amount of latency associated with different modules of a vehicle, and/or at different stages in the operation of a vehicle, the performance of the vehicle may be compromised.

Autonomous vehicles which may operate fully autonomously and/or semi-autonomously may be monitored and operated through the use of teleoperations systems, which may be remotely located. For example, when a vehicle is unable to navigate a particular obstacle while driving in an autonomous mode, a remote operator may intervene and use a teleoperations system to remotely operate the vehicle to avoid the obstacle. Network communications, e.g., wireless communications across modems, generally enable a vehicle to provide data to a remotely located teleoperations system, and vice versa, such that the remotely located teleoperations system may be used to operate the vehicle.

Communications between different modules of an autonomous vehicle generally has latency, and network communications generally also have latency. That is, there is typically at least some time delay or lag (so called "latency amount") between when data is sent from one module to another module, or from one endpoint to another endpoint. By way of example, there is typically a time delay associated with the transmission of data between a vehicle and a teleoperations system. A relatively large amount of latency may impact whether a remote operator or teleoperator may use a teleoperations system to safely operate a vehicle. For instance, if there is a relatively significant amount of time between when an image is obtained by a camera on a vehicle and when the image is transmitted to and received by a teleoperations system, a remote operator may be unable to safely react to an obstacle depicted in the image and a collision may occur.

In one example embodiment, an actual amount of latency may be estimated or obtained based on characteristics of the simulation e.g., number of pedestrians, complexity of the trajectory, etc.

In yet another example embodiment, an approximately maximum amount of latency that may effectively be tolerated within a system may be determined. The approximately maximum amount of latency that may effectively be tolerated within a system may be the substantially highest amount of latency which may be present while substantially ensuring that the system may operate safely (without a collision).

The system may be a vehicle, or the system may be a vehicle and a teleoperations system which engage in network communications. The determination of the approximate amount of latency that may effectively be tolerated may be accomplished by injecting or otherwise providing latency or time delays into a simulation system, and simulating what may occur if a vehicle were to be operated when effectively subjected to the approximate amount of latency. The approximate amount of latency that may effectively be tolerated within a vehicle may be used, for example, to determine when modules in a vehicle are substantially adequate. The approximate amount of latency that may effectively be tolerated in a network system may be used to determine when the network system is adequate to support the safe operation of a vehicle that is being monitored and/or operated using a teleoperations system.

Referring initially to FIG. 1, an autonomous vehicle fleet 100 will be described in accordance with an example embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles and may, in one example embodiment, be arranged to be monitored and/or controlled using a teleoperations system. In general, each autonomous vehicle 101 may be a vehicle that is capable of traveling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
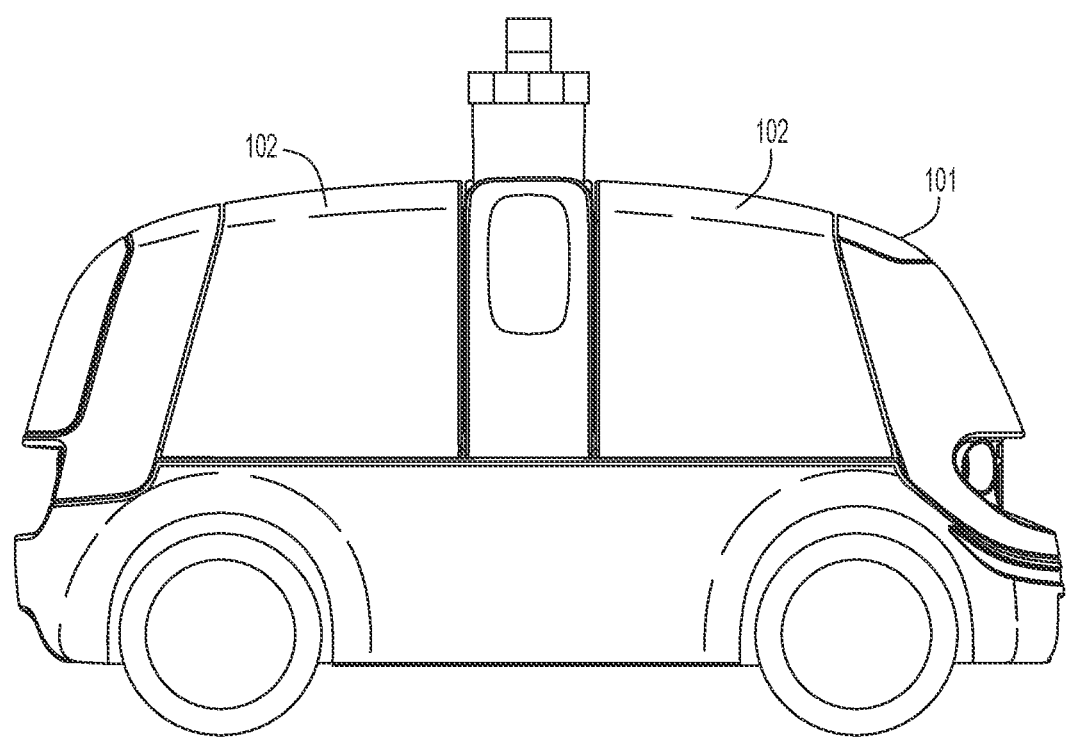
FIG. 2 is a diagram of an autonomous vehicle being driven using an autonomy system that is validated using a simulation scenario that accounts for latencies associated with operating the vehicle using the autonomous driving system, according to an example embodiment.

FIG. 2 is a diagram of a side of an autonomous vehicle, e.g., one of autonomous vehicles 101 of FIG. 1, in accordance with an example embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one example embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some example embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
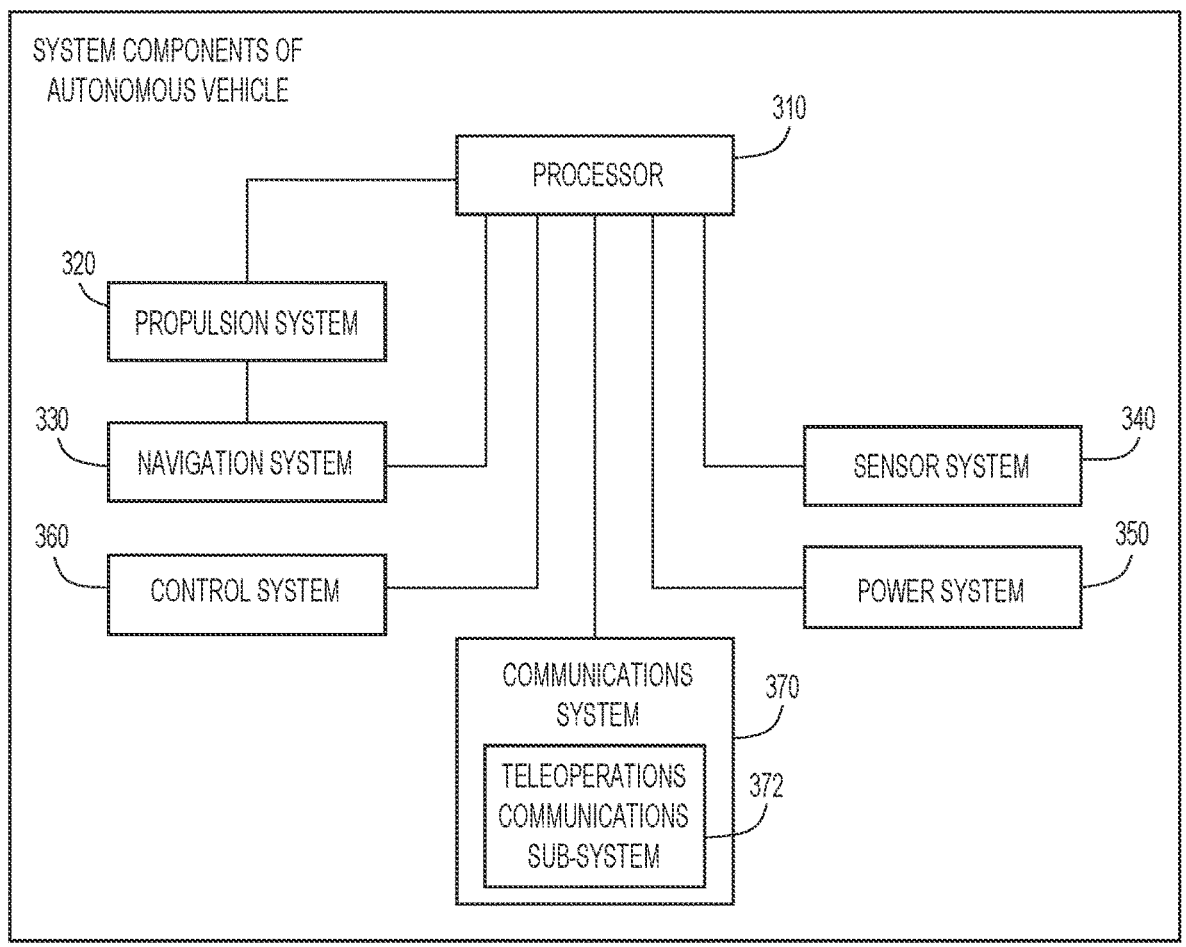
FIG. 3 is a block diagram of various components of an autonomous vehicle, according to an example embodiment.

FIG. 3 is a block diagram of an autonomous vehicle, e.g., autonomous vehicle 101 of FIG. 1, in accordance with an example embodiment. An autonomous vehicle 101 includes system components 300. The system components 300 include a processor 310, a propulsion system 320, a navigation system 330, a sensor system 340, a power system 350, a control system 360, and a communications system 370. It should be appreciated that processor 310, propulsion system 320, navigation system 330, sensor system 340, power system 350, and communications system 370 are all coupled to a chassis or body of autonomous vehicle 101.

Processor 310 is arranged to send instructions to and to receive instructions from or for various components such as propulsion system 320, navigation system 330, sensor system 340, power system 350, and control system 360. Propulsion system 320, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 320 may be arranged to cause the engine, wheels, steering, and braking systems to cooperate to drive. In general, propulsion system 320 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 330 may control propulsion system 320 to navigate autonomous vehicle 101 through paths and/or within unstructured open or closed environments. Navigation system 330 may include at least one of digital maps, street view photographs, and a global positioning system (GPS) point. Maps, for example, may be utilized in cooperation with sensors included in sensor system 340 to allow navigation system 330 to cause autonomous vehicle 101 to navigate through an environment.

Sensor system 340 includes any sensors, as for example LiDAR, radar, ultrasonic sensors, microphones, altimeters, and/or cameras. Sensor system 340 generally includes onboard sensors which allow autonomous vehicle 101 to safely navigate, and to ascertain when there are objects near autonomous vehicle 101. In one embodiment, sensor system 340 may include propulsion systems sensors that monitor drive mechanism performance, drive train performance, and/or power system levels. Data collected by sensor system 340 may be used by a perception system associated with navigation system 330 to determine or to otherwise understand an environment around autonomous vehicle 101.

Power system 350 is arranged to provide power to autonomous vehicle 101. Power may be provided as electrical power, gas power, or any other suitable power, e.g., solar power or battery power. In one embodiment, power system 350 may include a main power source, and an auxiliary power source that may serve to power various components of autonomous vehicle 101 and/or to generally provide power to autonomous vehicle 101 when the main power source does not have the capacity to provide sufficient power.

Communications system 370 allows autonomous vehicle 101 to communicate, as for example, wirelessly, with a fleet management system (not shown) that allows autonomous vehicle 101 to be controlled remotely. Communications system 370 generally obtains or receives data, stores the data, and transmits or provides the data to a fleet management system and/or to autonomous vehicles 101 within the autonomous vehicle fleet 100. The data may include, but is not limited to including, information relating to scheduled requests or orders, information relating to on-demand requests or orders, and/or information relating to a need for autonomous vehicle 101 to reposition itself, e.g., in response to an anticipated demand. In one embodiment, communications system 370 includes a teleoperations communications sub-system 372. Teleoperations communications sub-system 372 may include one or more modems, e.g., cellular modems such as LTE or 3G/4G/5G modems, which are arranged to cooperate to communicate with a fleet operations system (not shown) such that a teleoperations system of the fleet operations system may monitor and operate autonomous vehicle 101 remotely. It should be appreciated that teleoperations communications sub-system 372 may alternatively, or additionally, communicate substantially directly with a teleoperations system (not shown).

In some example embodiments, control system 360 may cooperate with processor 310 to determine where autonomous vehicle 101 may safely travel, and to determine the presence of objects in a vicinity around autonomous vehicle 101 based on data, e.g., results, from sensor system 340. In other words, control system 360 may cooperate with processor 310 to effectively determine what autonomous vehicle 101 may do within its immediate surroundings. Control system 360 in cooperation with processor 310 may essentially control power system 350 and navigation system 330 as part of driving or conveying autonomous vehicle 101. Additionally, control system 360 may cooperate with processor 310 and communications system 370 to provide data to or obtain data from other autonomous vehicles 101, a management server, a global positioning server (GPS), a personal computer, a teleoperations system, a smartphone, or any computing device via the communications system 370. In general, control system 360 may cooperate at least with processor 310, propulsion system 320, navigation system 330, sensor system 340, and power system 350 to allow vehicle 101 to operate autonomously. That is, autonomous vehicle 101 is able to operate autonomously through the use of an autonomy system that effectively includes, at least in part, functionality provided by propulsion system 320, navigation system 330, sensor system 340, power system 350, and control system 360. Components of propulsion system 320, navigation system 330, sensor system 340, power system 350, and control system 360 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomous driving system (an autonomy system). That is, when autonomous vehicle 101 is in an autonomous mode, autonomous vehicle 101 is able to generally operate without a driver or a remote operator controlling autonomous vehicle 101. In one example embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomy system to collect information and extract relevant knowledge from the environment provides autonomous vehicle 101 with perception capabilities. For example, data or information obtained from sensor system 340 may be processed such that the environment around autonomous vehicle 101 may effectively be perceived.

As will be appreciated by those skilled in the art, autonomous vehicle 101 may be referred to as an ego vehicle, a subject vehicle, or a vehicle and may be a representation of an autonomous vehicle that is being tested or otherwise exposed to a simulation.

As previously mentioned, the operation of an autonomous vehicle such as vehicle 101 may be monitored by and/or substantially controlled by a teleoperations system using network communications.

As such, an autonomous driving system may refer to an autonomy system in some example embodiments and to a teleoperations system in other example embodiments. Moreover, an autonomous driving system may represent both the autonomy system and the teleoperations system such that the autonomy system drives the vehicle for one part of the simulation and the teleoperations system drives the vehicle for another part of the simulation.

Figure 4:
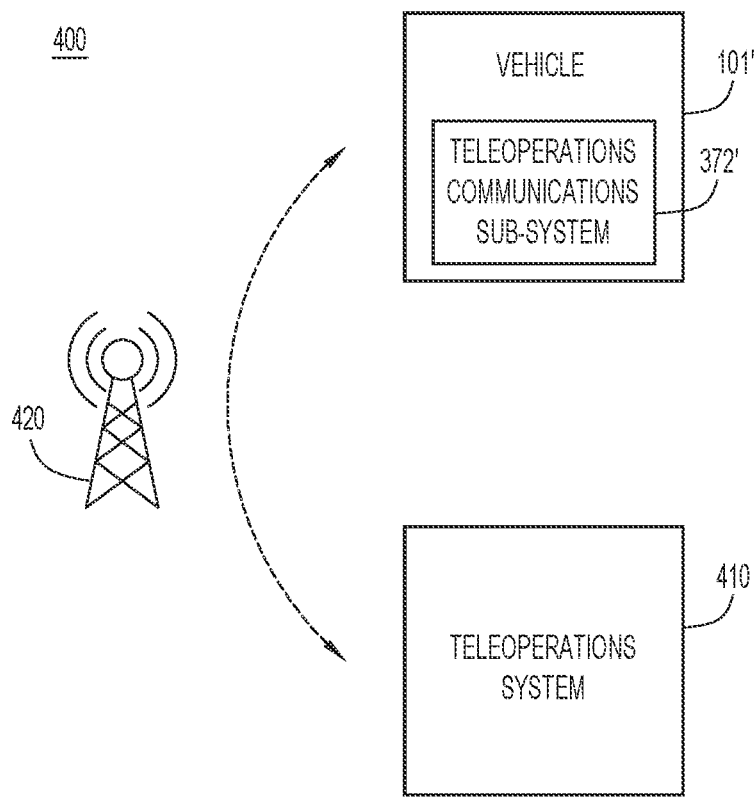
FIG. 4 is a block diagram of a system in which a vehicle communicates with a teleoperations system across a network, according to an example embodiment.

FIG. 4 is a diagram illustrating a system 400 in which a vehicle communicates with a teleoperations system across a network, according to an example embodiment. The system 400 includes an autonomous vehicle 101' and a teleoperations system 410 which is configured to monitor and/or operate vehicle 101' across a network 420.

Vehicle 101' includes teleoperations communications sub-system 372', which is configured to provide data to teleoperations system 410 via network 420. Teleoperations communications sub-system 372' may provide data from sensors onboard vehicle 101' to teleoperations system 410 to enable teleoperations system 410 to monitor and/or to operate vehicle 101'. Teleoperations system 410, which is further discussed below with respect to FIG. 5, may use data obtained from vehicle 101' to effectively monitor vehicle 101' and/or to substantially take control of the operation of vehicle 101'. When teleoperations system 410 is used to remotely operate vehicle 101', teleoperations system 410 may provide control signals to vehicle 101' across network 420.

In the system 400, vehicle 101' and teleoperations system 410 may communicate or otherwise exchange data substantially directly. It should be appreciated however, that vehicle 101' and teleoperations system 410 may instead communicate indirectly. By way of example, a fleet management system or server (not shown) may communicate with vehicle 101' and teleoperations system 410 such that the fleet management system or server effectively serves as an intermediary device or intermediate node between vehicle 101' and teleoperations system 410. That is, an intermediate node (not shown) may facilitate communications between endpoints, e.g., vehicle 101' and teleoperations system 410.

Figure 5:
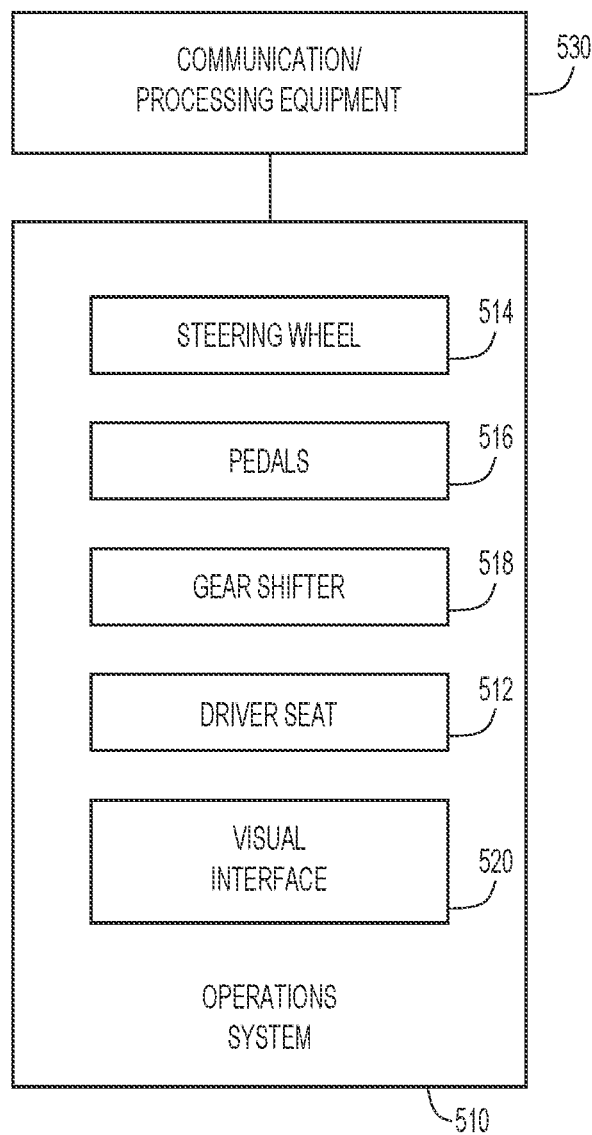
FIG. 5 is a block diagram illustrating components of a teleoperations system, according to an example embodiment.

FIG. 5 is a block diagram illustrating components of a teleoperations system 500 such as the teleoperations system 410 of FIG. 4, according to an example embodiment. The teleoperations s system 500 includes an operations system 510 and communication/processing equipment 530. Teleoperations system 500 may be part of a fleet management system.

Operations system 510 may resemble, in one example embodiment, a driver station in a typical automobile, and may include a driver seat 512, a steering wheel 514, acceleration and brake pedals 516, and a gear shifter 518. Operations system 510 also includes a visual interface 520 that is configured to allow a human operator to view the environment in which an autonomous vehicle that is to be driven or otherwise controlled by operations system 510 is located.

Visual interface 520 may include one or more display screens. Display screens may be LED, LCD, and/or OLED display screens. Visual interface 520 may be configured to provide any number of different views of the environment in which the autonomous vehicle is driving. Such views may include, but are not limited to including, front views, side views, and/or rear views. In one example embodiment, visual interface 520 may include a virtual-reality (VR) or augmented-reality (AR) headset.

Operations system 510 may be configured to have the approximate touch response of an actual driver station in an automobile. For example, steering wheel 514 may be configured to have a touch response that is similar to a power steering in an actual automobile, and pedals 516 may be configured to approximate the resistance of pedals in an actual automobile.

Steering wheel 514, acceleration and brake pedals 516, and gear shifter 518 may be connected to or otherwise coupled to communication/processing equipment 530. Communication/processing equipment 530 enables communication between operations system 510 and the autonomous vehicle that is configured to be remotely operated using operations system 510. Operations system 510 may be connected to communication/processing equipment 530 by physical cables and connections. It should be appreciated, however, that operations system 510 may instead be wirelessly coupled to communication/processing equipment 530 using any suitable method including, but not limited to including, Bluetooth and Wi-Fi. In addition, while operations system 510 may be substantially directly connected to communication/processing equipment 530, operations system 510 may instead be coupled to communication/processing equipment 530 through intermediate devices and/or networks, e.g., wireless and/or cellular networks.

Communication/processing equipment 530 may establish communications, as for example communications with an autonomous vehicle and/or with visual interface 520, using various communications technologies including, but not limited to including, IEEE 802.11x (Wi-Fi), cellular 3G/4G/5G, cellular LTE, wired communications, and/or other wired or wireless communication protocols. It should be appreciated that communication/processing equipment 530 generally includes one or more processors, memories, machine instructions, and/or hardware for processing visual information for display by the visual interface 520. Substantially any suitable method may be used to communicate, to process, and to display visual information.

Communication/processing equipment 530 is generally arranged to process signals from operations system 510, and to translate the signals into control instructions for controlling an autonomous vehicle. In one example embodiment, communication/processing equipment 530 is arranged to provide teleoperations capabilities. The signals provided by communication/processing equipment 530 may include control instructions for controlling a conveyance system of the autonomous vehicle to cause the autonomous vehicle to drive or to otherwise travel.

When a human operator turns or steers steering wheel 514, communication/processing equipment 530 may send corresponding control instructions to an autonomous vehicle to instruct the autonomous vehicle to turn or to drive in the direction indicated by the way the human operator steers steering wheel 514. In addition, when a human operator accelerates or brakes using pedals 516 of operations system 510, communication/processing equipment 530 sends corresponding control instructions to the autonomous vehicle to instruct the autonomous vehicle to accelerate or brake, respectively.

Simulation systems may generally be used to validate autonomous driving systems and/or teleoperations system 410 of FIG. 4 or teleoperations system 500 of FIG. 5. A simulation system may simulate the behavior of an autonomous driving system across a multitude of different real-world scenes, scenarios, and/or situations. A simulation system is a deterministic reproduction of an autonomous driving system i.e., actions performed by an autonomous stack. That is, a simulation system allows different autonomy-related algorithms to be tested with different real-world driving scenes to substantially ensure that once the autonomous driving system and/or teleoperations system are deployed, the vehicle may operate safely and reliably.

A relatively large number of different scenes, scenarios, and/or situations may be tested using simulations. Such scenes, scenarios, and/or situations are stored as simulation data and may include, but are not limited to including, different roads, different driving conditions, different traffic conditions, different obstacles, etc. The simulation data represents an environment in which a vehicle is driven for a predetermined time. The simulation data includes different simulation scenarios that have different features therein. For example, one simulation scenario may include a pedestrian crossing a path of an autonomous vehicle, another simulation scenario may include another vehicle traveling at a slower speed in front of the autonomous vehicle, etc.

When simulation system indicates that an autonomous driving system is ready for deployment (meets specifications or a predetermined threshold for safety), then the indication may be that the autonomy system may safely be deployed on a vehicle and/or that a teleoperations system may be used to safely operate the vehicle for a predetermined time. Safety may be quantified as collisions or miles per collision (MPC).

In one or more example embodiments, a simulation system which is configured to simulate the operation of a vehicle in an environment, as for example the remote operation of a vehicle in a selected environment, may be used to determine whether a particular amount of latency (e.g., in the system 400 of FIG. 4), is acceptable and allow for safe, remote operation of the vehicle e.g., whether remote operation of the vehicle with an injected, estimated latency amount is acceptable to avoid a collision. The simulation system simulates the operation of an autonomous vehicle and accounts for latencies associated with components or modules included in the autonomous vehicle. An estimated latency amount(s) (actual or maximum) associated with the autonomous vehicle may be provided to the simulation system, and a simulation may be run with the estimated latency amount(s) injected therein, or otherwise accounted for, in the simulation.

If the simulation indicates that the autonomous vehicle may operate safely, e.g., substantially without an incident such as a collision, then the estimated latency amount(s) is identified as being acceptable i.e., the autonomous driving system is ready for deployment. If, however, the simulation indicates that the autonomous vehicle may not operate safely (e.g., causes a collision), latency amount(s) may need to be adjusted using the simulation because the autonomous driving system is not ready for deployment. For example, latency amount(s) may be changed by changing the design of the components or modules included in the autonomous vehicle such that an acceptable latency amount(s) may be achieved. In one example embodiment, based on a simulation, a particular component of the autonomous vehicle that causes unacceptable latency may be identified for a reconfiguration and/or a redesign.

Figure 6A:
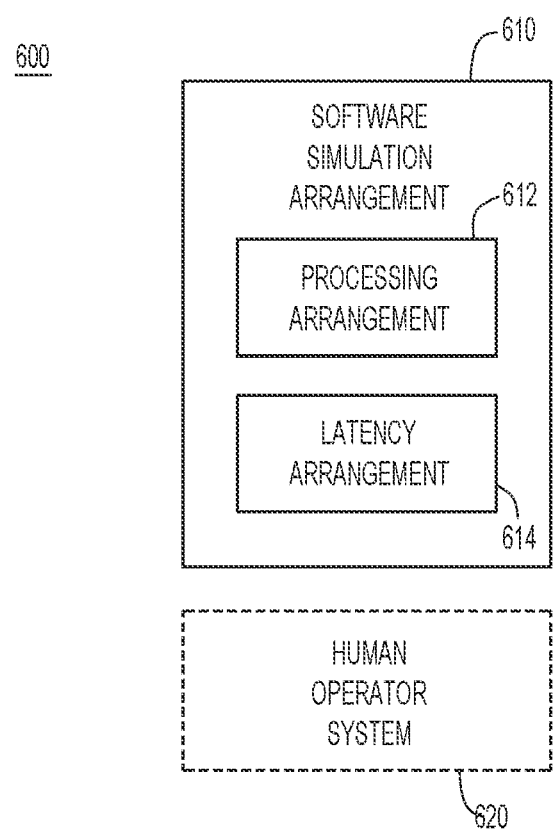
FIG. 6A is a block diagram of a simulation system which supports the injection of different latency amounts, according to an example embodiment.

FIG. 6A is a block diagram of a simulation system 600 which supports the injection of different latency amounts, according to an example embodiment. The simulation system 600, which may be embodied on one or more computing systems, includes a software simulation arrangement 610 and an optional human operator system 620.

Software simulation arrangement 610 includes a processing arrangement 612 and a latency arrangement 614.

Software logic or code devices which, when executed by a processing arrangement 612, enables simulations involving the control and operation of autonomous vehicles. The simulations assess whether the autonomous vehicle is ready for deployment.

Optional human operator system 620 may be configured to enable a human to simulate controlling a vehicle in a simulated environment provided by software simulation arrangement 610. In one example embodiment, optional human operator system 620 may include components similar to those of a teleoperations system, e.g., teleoperations system 500 of FIG. 5. It should be appreciated that in lieu of optional human operator system 620, software simulation arrangement 610 may be configured to simulate control by a human operator.

As will be appreciated by those skilled in the art and as noted above, a simulation may include virtual scenarios created from real world data which may be used to essentially test or otherwise evaluate the operation of autonomous vehicles. Simulation data represents an environment in which a vehicle is driven for a predetermined time e.g., a scene, multiple scenes, etc. Such simulations may also enable the operation of an autonomous vehicle using a teleoperations system to be substantially tested. In one example embodiment, software simulation arrangement 610 may essentially display real world driving situations (simulation data) and enable data to be collected regarding how a vehicle, or a vehicle operated by a teleoperator, may react in a particular situation or scenario.

Latency arrangement 614 may include software logic or code devices which, when executed by processing arrangement 612, enables simulations to be run (simulation scenarios) that simulate how different amounts of latency associated with the operation of a vehicle may affect the vehicle. For example, the amounts of latency may relate to the exchange of data between different components or modules within a vehicle. Alternatively, the amounts of latency may correspond to a network latency associated with communications between a vehicle and a teleoperations system.

One or more latency amounts may be substantially injected into a simulation by latency arrangement 614 forming a simulation scenario which accounts for various delays noted above. For example, latency arrangement 614 facilitates the inclusion of time delays associated with one module of a vehicle providing data and another module of the vehicle obtaining the provided data. As another example, latency arrangement 614 facilitates the inclusion of time delays associated with providing data from a vehicle to a teleoperations system in a simulation scenario. Through latency arrangement 614, software simulation arrangement 610 may effectively simulate how a vehicle may behave in response to latency within the vehicle, and/or when a network that supports the vehicle and a teleoperations system has a particular amount of latency associated with the exchange of data. Latency arrangement 614 may be configured to enable simulations to be run for varying amounts of latency, e.g., for different time delays. For example, software simulation arrangement 610 may run simulations of substantially the same scenario with different time delays to determine a substantially threshold time delay below which a vehicle may operate safely.

Latency arrangement 614 may be configured to determine amounts of latency to inject into and/or to otherwise set in simulations based on these scene-based and/or component specific models. In one example embodiment, determining latency amounts to inject into a simulation may involve obtaining data relating to a substantially maximum latency that may be associated with the exchange of data within a vehicle. According to another example embodiment, determining latency amounts to inject into a simulation may involve scene-based and/or function-based latency amounts, which are then aggregated to compute the end-to-end latency amount. In yet another example embodiment, determining amounts of latency to inject into a simulation may involve obtaining data relating to a substantially maximum amount of data that may be associated with communications between a vehicle and a teleoperations system. Data that indicates how much latency may exist in a system whether that system includes a vehicle or both a vehicle and a teleoperations system, e.g., the teleoperations system 410 of FIG. 4, may be substantially measured using or otherwise obtained from a hardware-in-the-loop (HIL) system.

Figure 6B:
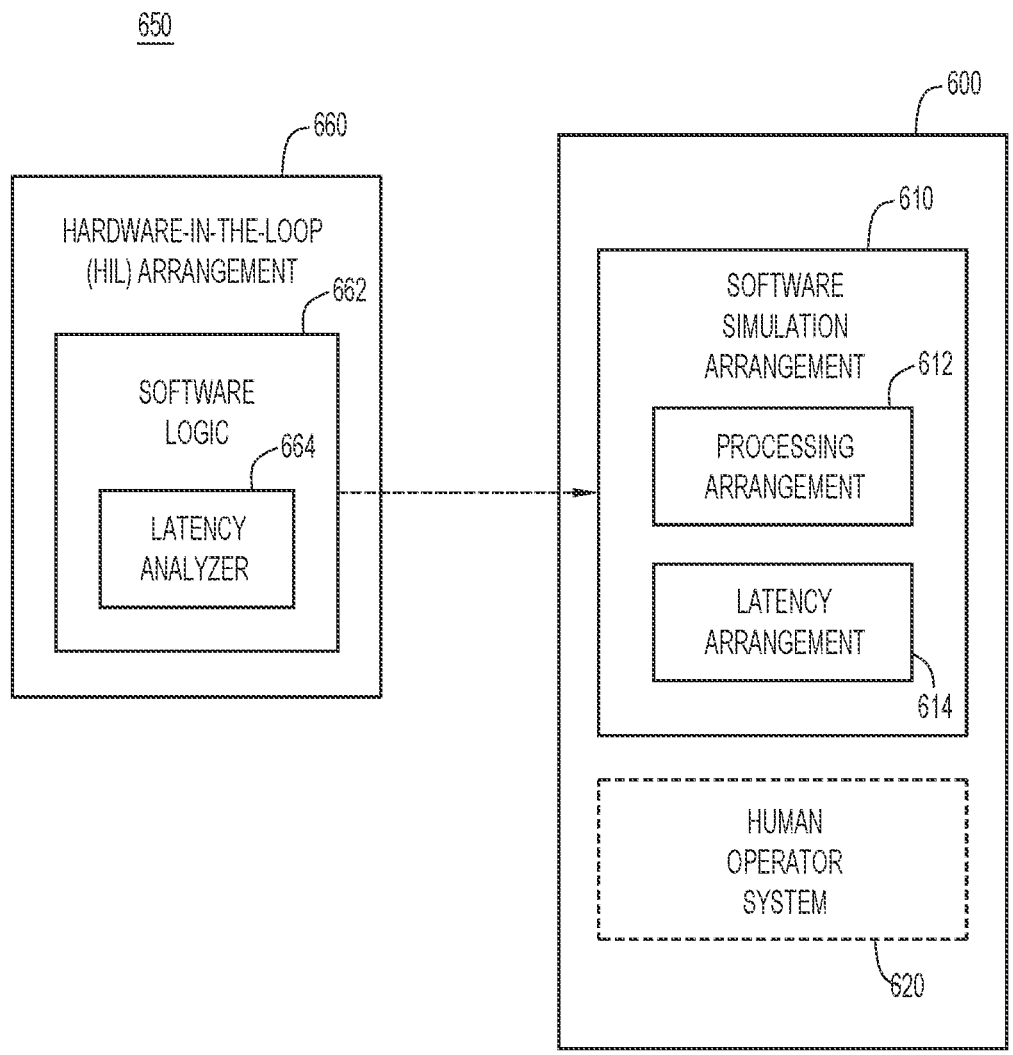
FIG. 6B is a block diagram of a system which enables various levels or latency amounts to be injected into a simulation system, using a hardware-in-the-loop (HIL) arrangement, according to an example embodiment.

FIG. 6B is a block diagram of a system 650 which enables various levels or latency amounts to be injected into a simulation system, e.g., the simulation system 600 of FIG. 6A, using a hardware-in-the-loop (HIL) arrangement 660, according to an example embodiment.

The HIL arrangement 660 includes software logic 662 and a latency analyzer 664 that is configured to provide latency information or data to software simulation arrangement 610. HIL arrangement 660 is a framework that enables tests to be run on different versions of software which may be in consideration for use on an autonomous vehicle such as autonomous vehicle 101 of FIGS. 2 and 3. In one example embodiment, HIL arrangement 660 may use the same components, sensors, and software that is onboard a vehicle such that HIL arrangement 660 may operate similarly to the vehicle. For example, HIL arrangement 660 may include substantially the same compute system and processing unit used on a vehicle such as vehicle 101 of FIGS. 2 and 3. The HIL arrangement 660 is similar to an autonomous driving system to be deployed on an autonomous vehicle.

Software logic 662, which may be executed by a processor, is arranged to substantially assess the impact of performance optimizations. Latency analyzer 664 may substantially measure latency statistics associated with different modules within HIL arrangement 660, as well as latency statistics associated with HIL arrangement 660 overall (aggregated latency statistics). As HIL arrangement 660 has substantially the same components as included on an actual vehicle, HIL arrangement 660 may allow the actual latency associated with the actual vehicle to be relatively accurately estimated.

Latency analyzer 664 may monitor, measure, and/or approximate latency or time delay associated with data being transmitted and/or received by or within HIL arrangement 660. In one example embodiment, latency analyzer 664 may effectively identify a substantially maximum or estimated actual amount of latency that may be associated with HIL arrangement 660, and HIL arrangement 660 may provide an indication of the latency amount to latency arrangement 614. Upon obtaining an indication of the predicted latency amount, latency arrangement 614 may inject the predicted latency amount into one or more simulations.

According to one example embodiment, HIL arrangement 660 may generate various latency models with latency profiles for various components of an autonomous driving system such as, but not limited to, perception related components (e.g., sensor system 340 of FIG. 3), prediction related components, planning related components, and/or control related components. The latency amounts may be determined for each component of an autonomous driving system based on one or more features in the HIL simulation data. Features define one or more elements in the scenes during HIL simulation such as, but not limited to, objects/agents present in the environment surrounding the vehicle, complexity of the road/path, and/or difficulty of the vehicle maneuver (predicted trajectory), etc. The HIL arrangement 660 generates a plurality of scene-based latency models in which time delays vary based on the features in the simulation data. That is, computational or processing load/delay for various components may vary depending on the features in the scenario and the compute hardware in HIL arrangement 660.

These latency models are then evaluated and one or more is selected and provided to the latency analyzer 664 to inject an estimated but more accurate latency amount for a particular simulation to be executed by the software simulation arrangement 610. The selected latency model provides one or more dynamic latency profiles that match characteristics of the simulation being performed (i.e., features in the simulation data). In one example, a latency model selected for each component or functional part of the autonomous driving system approximately estimates the latency amount for a specific moment in a respective scene in a simulation. The latency amounts selected for various components of the autonomous driving system may be aggregated to generate an end-to-end latency (total latency). The total latency is indicative of a time photons were sensed or detected by one or more sensors of the vehicle to the time a corresponding action/reaction is performed by the vehicle which determines how fast the system can react to environmental changes. The modeled, scene-based latency generated with a set of statical model(s) provides a more accurate estimate of the actual latencies that will be incurred by the vehicle controlled by the autonomous driving system (an autonomy system and/or teleoperations system) in the real world.

Figure 7:
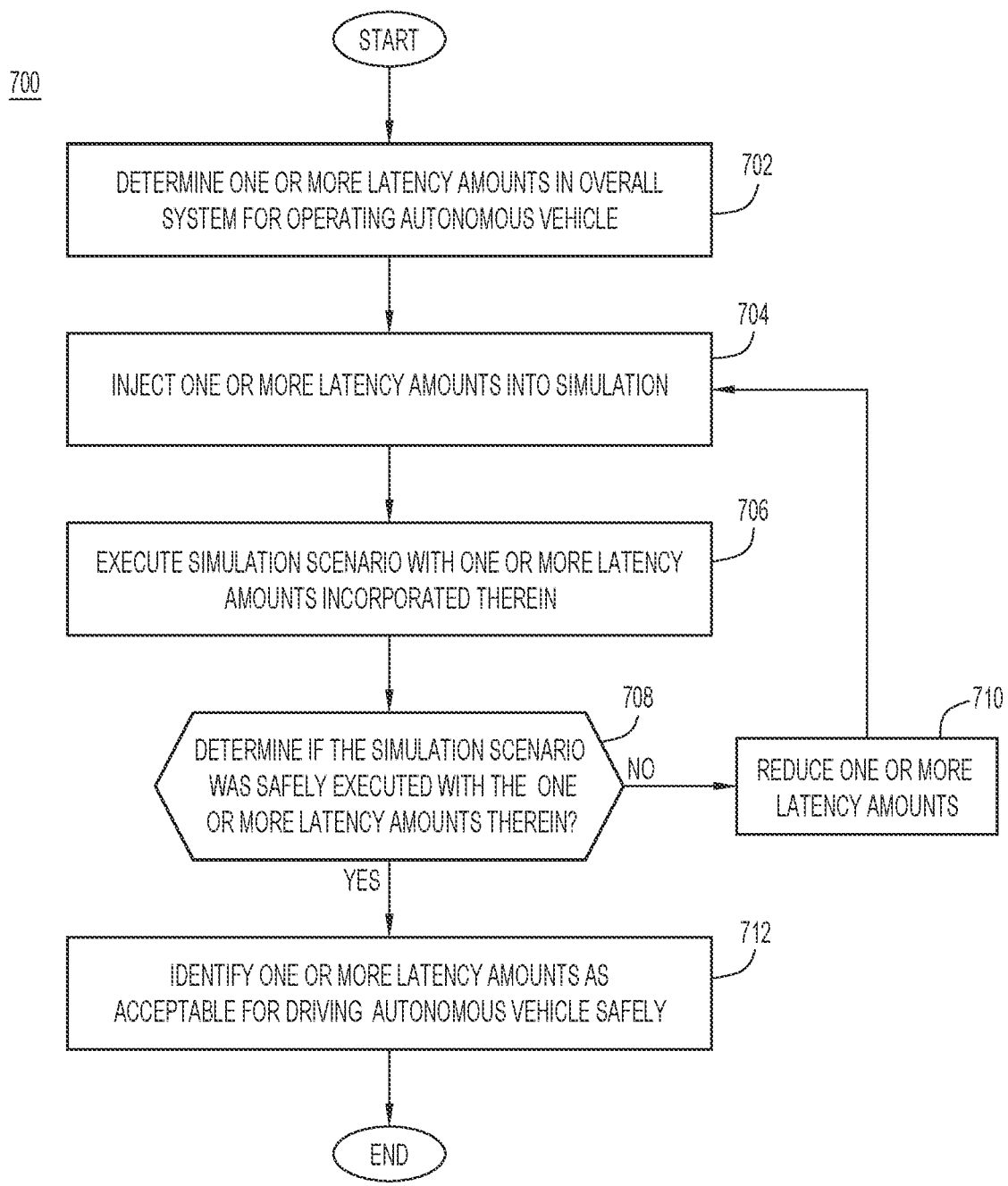
FIG. 7 is a flow chart illustrating a method of utilizing latency in a simulation for validating an autonomous vehicle, according to an example embodiment.

FIG. 7 is a flow chart illustrating a method 700 of utilizing latency in a simulation for validating an autonomous vehicle, according to an example embodiment. The method 700 may be performed by one or more computing devices such as the simulation system 600 of FIG. 6A or the system 650 of FIG. 6B. The method 700 determines whether latency associated with operating the vehicle using the autonomous driving system (with or without the teleoperations system) is acceptable i.e., the autonomous vehicle is validated as operating safely and/or ready for deployment.

The method 700 begins at 702, in which approximate latency amount(s) are determined. One or more latency amounts in an overall system for operating the autonomous vehicle are determined. The latency amount may be an end-to-end latency such as a maximum allowable latency before collision occurs or an aggregated estimate of an actual latency among various components that will be incurred by the autonomous vehicle. Latency amounts may be scene-based time delays that are specific to various components or functions of the autonomous vehicle. Some latency amounts may be of a fixed, predetermined duration, value, or time while other latency amounts may be dynamically determined based on characteristics of the stimulation data i.e., scenario or simulation being performed. Latency amounts may be scene-based network time delays associated with communicating with remotely located teleoperations system that controlled the vehicle.

In one example embodiment, the approximately latency amounts may involve estimating an approximate maximum latency amount "N" that is expected in an overall system (e.g., the autonomous driving system and/or the teleoperations system). For example, the overall system may be a vehicle system, e.g., the approximately maximum amount of latency "N" may correspond to an approximately maximum amount of latency associated with communications between components or modules included on a vehicle.

In another example embodiment, the overall system may include a vehicle and a remotely located teleoperations system, and the approximately maximum latency amount "N" may correspond to an approximately maximum latency associated with a network which supports communications between the vehicle and the remotely located teleoperations system. As mentioned above, the approximately maximum latency "N" may be obtained using a HIL arrangement such as the HIL arrangement 660 of FIG. 6B.

In yet another example embodiment, the approximately latency amount may be an estimated expected latency based on the features or characteristics in the scene (simulation data) and/or the processing or computational load for various components of the autonomous vehicle e.g., the autonomous driving system and/or teleoperations system. Some examples of determining one or more estimated scene-based latency amount(s) in an overall system for operating an autonomous vehicle are discussed in further detail below with reference to FIGS. 8-11. The estimated scene-based latency amounts are then injected to each respective component of the autonomous driving system to account for latencies involved with operating the vehicle using the autonomous driving system and/or teleoperations system.

The method 700 further involves at 704, injecting one or more latency amounts, determined at 702, into a simulation (i.e., simulation data). That is, a simulation scenario is configured to account for the one or more latencies. In one example, a latency amount "N" is added to simulation data to generate a simulation scenario that accounts for latencies. Once the latency amount(s) is injected into the simulation, a simulation scenario for testing is generated. Specifically, at 706, the method 700 involves running or executing the simulation scenario with latency amount(s) incorporated or simulated therein.

The method 700 further involves at 708, determining whether autonomous vehicle drives through the simulation scenario safely e.g., without any collisions or accidents. It is determined whether running the simulation scenario of the overall system involved any significant incidents which generally affect the safety with which the overall system may operate.

If, at 708, it is determined that there is at least one collision or accident that occurred in running the simulation scenario (NO at 708), the implication is that the latency amount(s) may not enable the overall system to meet a desired safety metrics or levels (a predetermined safety standard such as MPC below a predetermined threshold "Th"). Accordingly, the method 700 proceeds to 710, in which one or more latency amounts are reduced, described in FIG. 13. Specifically, the one or more latency amounts injected into the simulation data are effectively reduced to a smaller amount (smaller delay or time value) to substantially identify latency amount(s) that may enable the overall system to meet safety standards (i.e., be validated as safe and/or ready for deployment). When the one or more latency amounts are reduced at 710, the method 700 returns to operation 704 in which the new latency amount(s) are injected into the simulation data and the simulation scenario is executed. It should be appreciated that the actual amount or value by which one or more latency amounts are reduced may vary widely.

Alternatively, if it is determined at 708, that there were no collisions or accidents, the indication is that the latency amount(s) are such that the overall system may be considered to operate safely or otherwise meet safety standards. In one example, it is ready for deployment. As such, when latency amount(s) are identified as acceptable for the overall system to operate safely at 712, and the method 700 of utilizing latency in a simulation scenario is completed.

Figure 8:
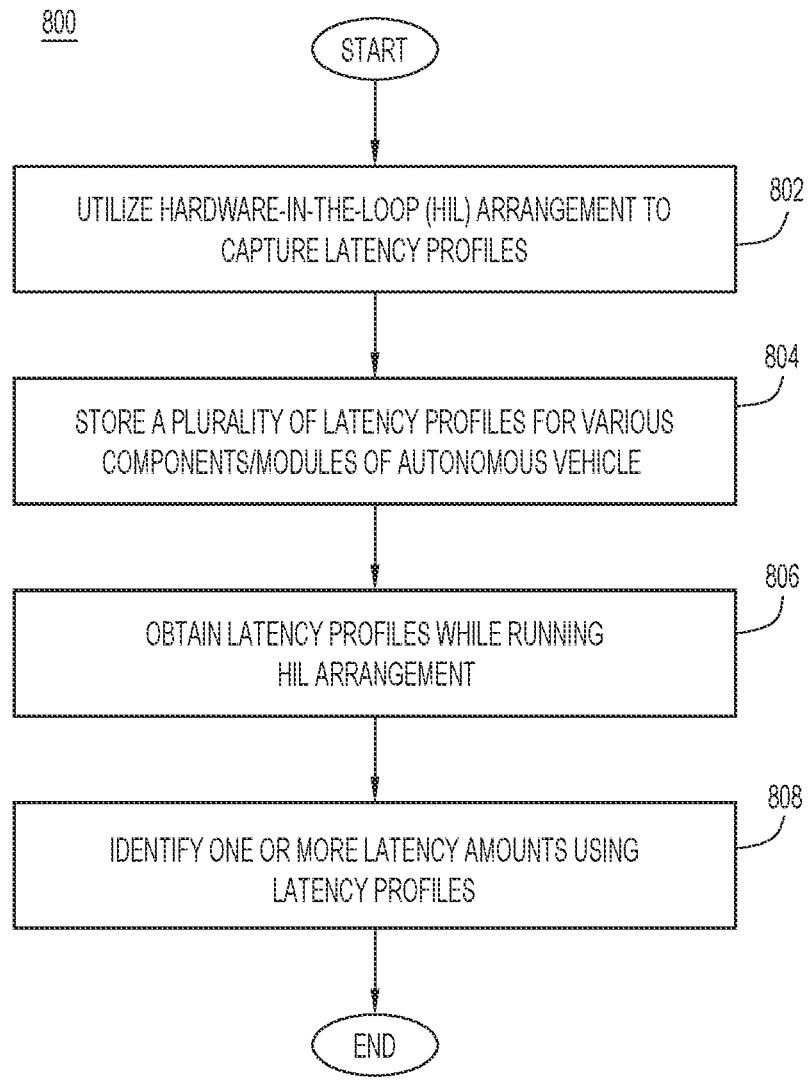
FIG. 8 is a flow chart illustrating a method of determining one or more latency amounts in an overall system, according to an example embodiment.

FIG. 8 is a flow chart illustrating a method 800 of determining one or more latency amounts in an overall system, e.g., operation 702 of FIG. 7, according to an example embodiment. The method 800 may be performed by one or more computing devices such as the system 650 of FIG. 6B.

The method 800 of determining an approximately latency amount(s) in an overall system begins at 802, in which a HIL arrangement (e.g., the HIL arrangement 660 of FIG. 6B) is used to capture or generate latency profiles, and/or to determine latency amounts associated with the overall system. If the overall system is a vehicle, the latency amounts may be associated with time delays in exchanging data among components of modules of the vehicle. If the overall system is a network system that includes a vehicle and a teleoperations system, the latency amounts may be associated with a delay between data being sent by the vehicle and received by the teleoperations system and/or vice versa. In one example embodiment, both latencies are determined when the overall system is both the vehicle that is operated by the autonomous driving system in one or more part of the simulation scenario and by the teleoperations system in another part of the simulation scenario.

The latency profiles may be static profiles and/or dynamic profiles. In one example, a latency profile involves values or indicators such as a constant value "N" (a predetermined delay time e.g., 0.02 seconds). In another example, a latency profile involves a machine learning (ML) model or a dynamic schema such as latency profiles explained with reference to FIGS. 9-11. The latency profile may be for a particular component of the autonomous driving system. There may be multiple latency profiles for a particular component of the autonomous driving system based on various features of the simulation data. At 804, a plurality of latency profiles for various components/functions of the overall system are stored in a memory or a database and may be used by one or more simulation systems such as the simulation system 600 of FIG. 6A or FIG. 6B. In one example, the latency profiles or indicators are stored and/or processed as feature(s)/time delay pairs.

The method 800 further involves at 806, obtaining applicable latency profiles for various modules and/or functions of the autonomous vehicle, while running HIL arrangement such as the HIL arrangement 660 of FIG. 6B. In one example, the latency profiles with features that match characteristics of the current simulation are obtained for one or more components or functions of the overall system.

The method 800 further involves at 808, identifying one or more latency amounts to inject into the simulation data using the applicable latency profiles. The applicable latency profiles match characteristics in the simulation data. For example, if the simulation scenario includes a scene with a pedestrian crossing the path on which the vehicle is traveling, the latency profile that includes a pedestrian crossing the path is selected and used to determine latency amount. Based on various estimated latency amounts for various components of the overall system, a total or aggregated latency amount(s) may be estimated and injected into the simulation.

In one example, a maximum latency amount may be identified using the matching latency profiles (i.e., a worst-case latency). By way of example, when an overall system is a vehicle, the highest latencies associated with communications between different components of the vehicle (or communication between the vehicle and teleoperations system) may be added together to effectively identify a worst-case latency. Once the maximum amount of latency is identified using latency profiles, the method 800 of identifying one or more latency amounts is completed.

When a maximum amount of latency that is acceptable in an overall system that is identified in simulation is less than a maximum amount of latency that is determined using a HIL arrangement, the latency issues may be addressed by altering the HIL arrangement to determine if there is a configuration of the HIL arrangement and, hence, an overall system that may support the maximum amount of latency identified in simulation.

In another example, characteristics of the simulation data are analyzed to select scene-based latency profiles in which features match the characteristics of the simulation data. The scene-based latency profiles may estimate a time delay involved with processing a particular scene by a particular component based on the features in the scene. Scene-based latency profiles compute time delays based on a set of factors indicative of complexity involved with running a target simulation, i.e., complexity of the processing required by the autonomous driving system (with or without the teleoperations system) for running the target simulation. In one example embodiment, time delays are computed for a particular component of the autonomous driving system (with or without the teleoperations system).

Figure 9:
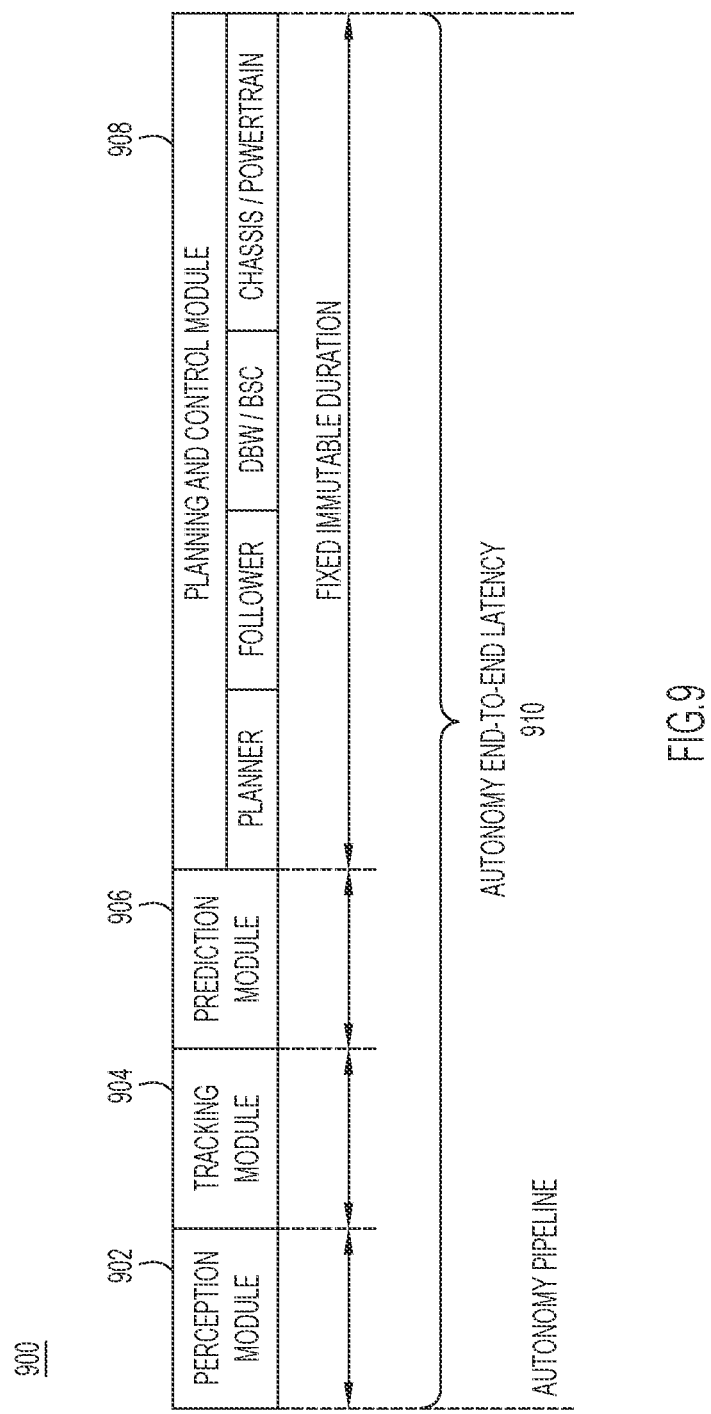
FIG. 9 is a view illustrating an autonomy pipeline for operating an autonomous vehicle for which individual latencies for various components are estimated, according to an example embodiment.

FIG. 9 is a view illustrating an autonomy pipeline 900 for operating an autonomous vehicle for which individual latencies for various components are estimated, according to an example embodiment. The autonomy pipeline 900 is one non-limiting example of various modules involved in operating the autonomous vehicle and for which latencies are computed separately because they vary based on elements of the scene. The autonomy pipeline 900 includes a perception module 902, a tracking module 904, a prediction module 906, and planning and control module 908. An autonomy end-to-end latency 910 may be the total or the overall time delay of operating the autonomous vehicle using the autonomous driving system (with or without the teleoperations system).

The perception module 902 obtains sensing or measured data. The perception module 902 processes data from different sensors of an autonomous vehicle such as "tracks" or "perceptions" detected by the sensor system 340 of FIG. 3. A track or perception is an element that is detected in an environment in which a vehicle is driven. For example, a track may be an object or an agent on a road on which the vehicle is traveling. A delay associated with the perception module 902 involves determining a duration of perception i.e., how long it takes to obtain the sensing or measured data. It is a delay associated with detecting various tracks, referred to as a "perception latency". Perception latency varies depending on detectors involved and features of the scene in the simulation data. Perception latency varies based on number of inputs and types of detections. As one example, perception latency associated with tracking one agent (one track) in the simulation data (scene) is shorter than perception latency associated with tracking several agents (several tracks) by the sensor system.

The tracking module 904 is configured to analyze the sensed data and classify the sensed data into various categories. The tracking module 904 identifies the environment in which the vehicle is driving for a predetermined time using an autonomous driving system (which may or may not include a teleoperations system). In one example embodiment, the tracking module 904 processes each track or perception to classify into a respective feature or category (e.g., agent, object, road type, etc.). For example, the tracking module 904 may determine that a track is an agent (e.g., a pedestrian), an object (e.g., a cone, a traffic light, or a poll), or a moving object (e.g., a bicycle or another car).

The tracking module 904 is associated with a tracking latency or delay associated with identifying or classifying one or more elements (features) in the sensed data. These elements (features) relate to driving the vehicle or one or more tracks present in the environment of the vehicle. The tracking delay varies based on a number and complexity of the tracks (e.g., type and quantity of objects or agents). For example, the tracking module 904 may require longer processing time to classify or identify a dog running across the path along which the vehicle is traveling versus a traffic light or a poll.

The prediction module 906 analyzes the classified perceptions or tracks to determine a plurality of trajectories i.e., possible paths for continuing to drive the vehicle safely along the path without a collision or accident. In one example embodiment, the prediction module 906 determines a plurality of hypothetical trajectories for continuing to drive the vehicle based on the classified tracks. The prediction module 906 incurs a computing delay associated with generating one or more trajectories for continuing to drive the vehicle safely (without a collision) based on the features/elements in the environment. The computing delay varies based on number of predicted trajectories that are computed for each element in the environment for continuing to drive the vehicle.

The planning and control module 908 relates to controlling the vehicle along the selected trajectory or path for continuing to drive the vehicle. The planning and control module 908 may involve a planner, a follower, a drive-by-wire (DBW)/brake system control (BSC), chassis and powertrain functions of the vehicle. For example, the planning and control module 908 generates control instructions for a propulsion system of the vehicle such as the propulsion system 320 of FIG. 3. Typically, these mechanical latencies do not vary and are of fixed immutable durations.

The autonomy pipeline 900 further involves determining the autonomy end-to-end latency 910 which aggregates at least the perception delay, the tracking delay, and the computing delay. Using the autonomy pipeline 900, an estimated latency amount(s) may be injected into a simulation data. The estimated latency amount(s) are deterministically obtained based on the environment and elements therein. Estimated latency amount(s) are computed based on a set of factors and are indicative of the complexity of the simulation scenario, thus more accurately represent the delay of controlling the vehicle using the autonomous driving system (with or without the teleoperations system).

Figure 10:
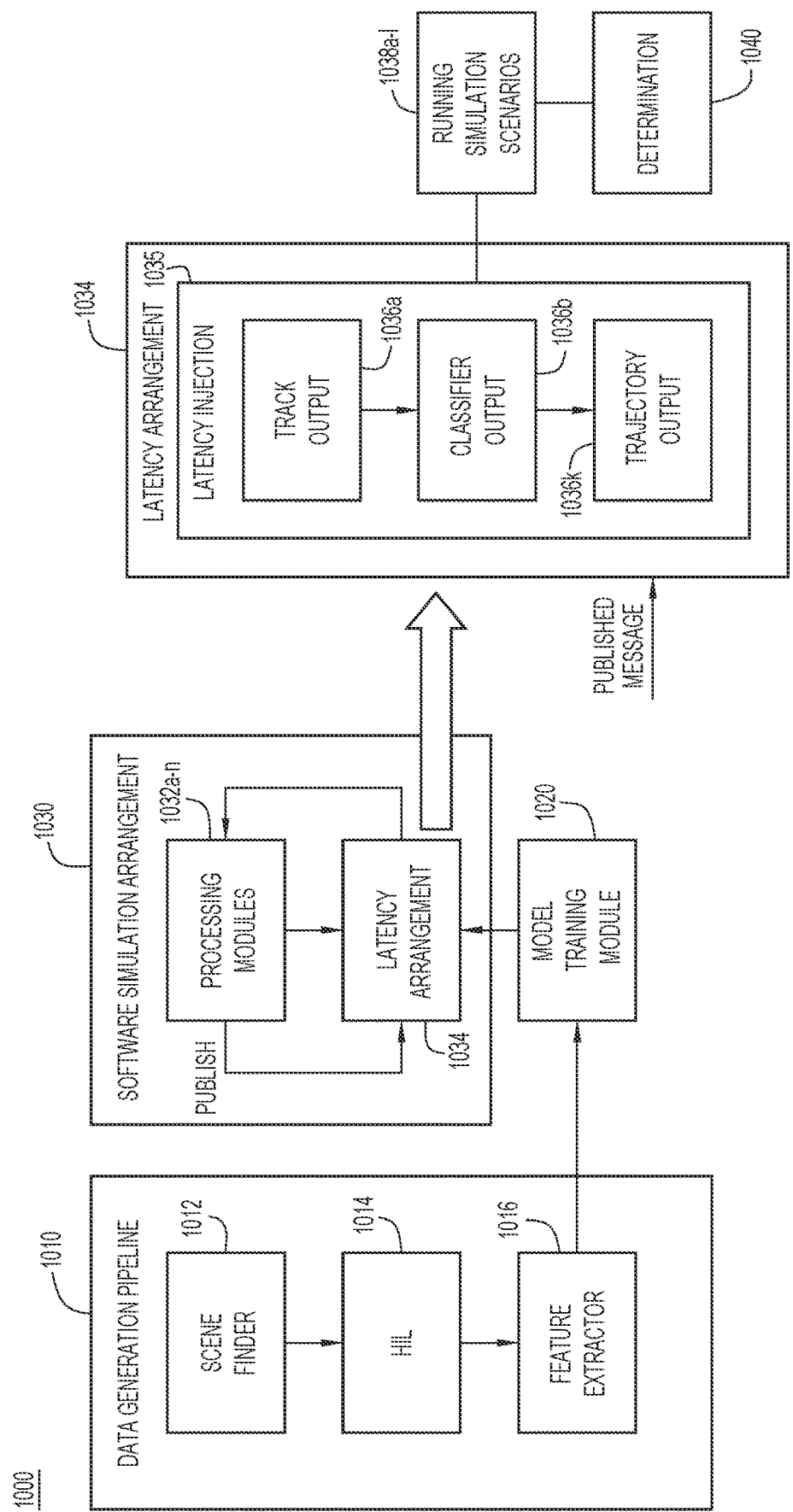
FIG. 10 is a flow diagram illustrating a latency injection system for selecting one or more latency amounts based on characteristics of a simulation and a plurality of generated latency profiles, according to an example embodiment.

With continued reference to FIG. 9, FIG. 10 is a diagram illustrating a latency injection system 1000 for selecting one or more latency amounts based on characteristics of a simulation and a latency model, according to an example embodiment. The latency injection system 1000 may be implemented by one or more computing devices such as a computing device of FIG. 16. The latency injection system 1000 involves a data generation pipeline 1010, a model training module 1020, a software simulation arrangement 1030 such as the software simulation arrangement 610 of FIG. 6A or FIG. 6B.

The data generation pipeline 1010 generates input and output pairs (feature and latency pairs) for the model training module 1020 that performs machine learning (ML) to generate various latency profiles. The software simulation arrangement 1030 runs one or more simulation scenarios that have various estimated latency amounts injected therein.

Specifically, the data generation pipeline 1010 includes a scene finder 1012, a HIL 1014 such as the HIL arrangement 660 of FIG. 6B, and a feature extractor 1016.

The scene finder 1012 obtains environment data or raw driving data, which may include multiple driving logs of a vehicle driven in a real-world and/or simulated environment. In one example, the environment data includes a plurality of scenes that represent an environment in which a vehicle is driven for a predetermined time. Typically, a scene is short in duration e.g., 15-25 seconds. Some non-limiting examples of a scene include an intersection along a path an autonomous vehicle is traveling, a portion of a local road, a portion of a highway, an intersection, etc. The environment data may be raw data of a plurality of driving logs and/or indexed scenes. The environment data may be used to validate or otherwise train an autonomous driving system (with or without the teleoperations system) associated with autonomous vehicles.

The scene finder 1012 obtains raw driving data and generates a training scene set therefrom, which includes scenes with different latencies. The scene finder 1012 analyzes the environment data to select a representative set of logs or scenes that include various complexities (different features such as a predetermined number of scenes with a pedestrian, a predetermined number of scenes with a traffic light, etc.). The training scene set may include a uniform distribution of latencies i.e., one or more scenes for each type, complexity, and/or latency amount.

The HIL 1014 runs a plurality of simulations using the training scene set to determine a respective latency amount for each scene in the training scene set. The HIL 1014 is a framework that enables simulations to be run on a software which is indicative of a respective target autonomous driving system (with or without the teleoperations system). In other words, HIL 1014 mimics the behavior of the target autonomous driving system being validated and generates latency amounts specific or representative of the target autonomous driving system (i.e., a particular software type and/or version to be used for the autonomous driving system). The HIL 1014 synchronizes latencies of the training scene set for a specific target autonomous driving system and outputs simulation data with latency amounts incurred by the target autonomous driving system.

The feature extractor 1016 generates a plurality of feature/latency pairs based on the simulation data from HIL 1014. In one example, the feature extractor 1016 filters the simulation data to determine latency of the perception module, tracking module, and prediction module such as the modules of the autonomy pipeline 900 of FIG. 9. The feature extractor 1016 provides the feature and latency pairs to the model training module 1020 for performing ML to generate a latency model in which various features or factors are associated with various latencies (e.g., latency profiles specific to various features or elements in the environment and/or to various components of the target autonomous driving system), described in FIG. 11.

The software simulation arrangement 1030 includes a plurality of processing modules 1032a-n such as the processing arrangement 612 of FIGS. 6A and 6B or more particularly, the perception module 902, the tracking module 904, the prediction module 906, and the planning and control module 908 of FIG. 9. The software simulation arrangement 1030 further includes a latency arrangement 1034 such as the latency arrangement 614 of FIGS. 6A and 6B.

The processing modules 1032a-n "publish" a message with a particular output such as sensed element, classified element, trajectory prediction, control instruction, etc. The latency arrangement 1034 analyzes the message to determine a corresponding amount of latency to inject into the simulation based on the latency model. The latency arrangement 1034 includes a latency injection component 1035 that is configured to inject the determined or estimated amount of latency into one or more simulations.

In one example embodiment, the latency arrangement 1034 determines that the message is output by one of the plurality of processing modules 1032a-n and applies the latency model to inject an estimated matching latency amount using the latency injection component 1035. The latency arrangement 1034 may determine that the message is a track output 1036a (a perception sensed by a sensor module), a classifier output 1036b (type of element identified by a tracking module), a trajectory output 1036k (predicted trajectory path computed by a prediction module), etc. Based on this determination and the latency model, a determined latency amount is inserted into the simulation by the latency injection component 1035.

The software simulation arrangement 1030 then runs one or more simulation scenarios 1038a-l with the specific latency amounts injected therein and determines whether the autonomous driving system (with or without the teleoperations system) is ready for deployment and/or operates safely by outputting a determination 1040 indicating whether the autonomous driving system is validated or requires a redesign.

Figure 11:
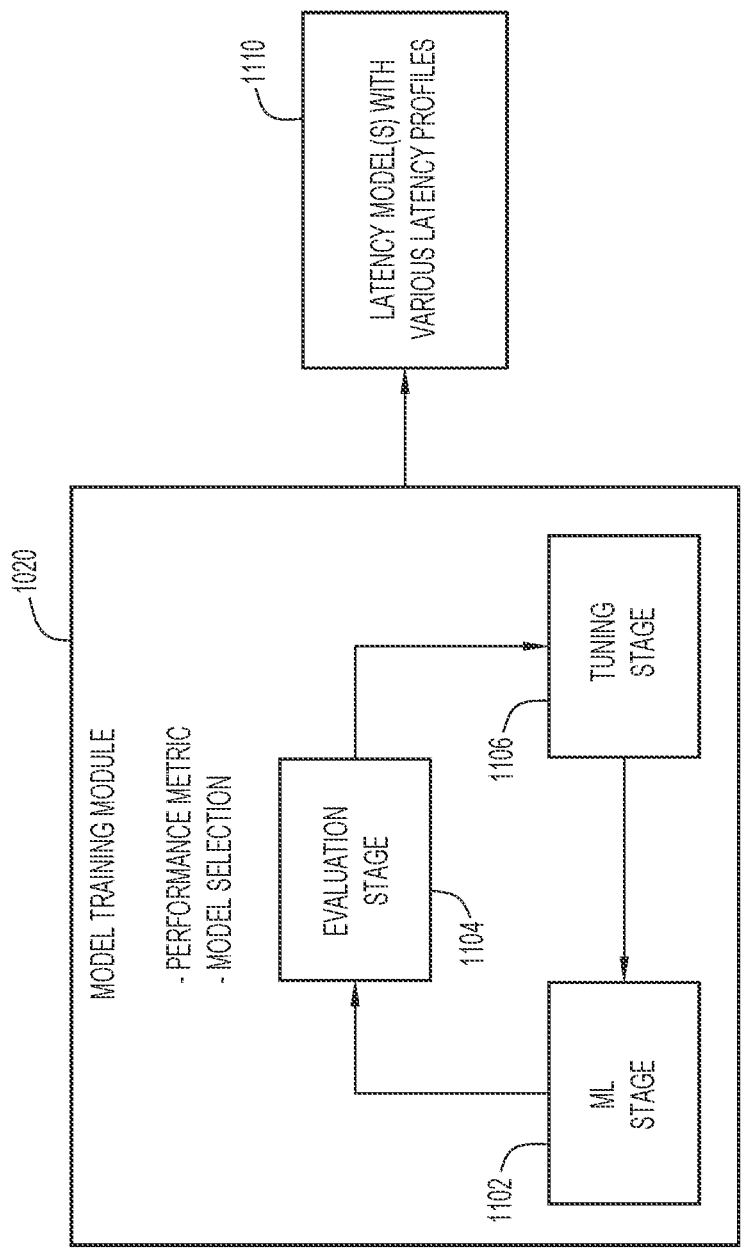
FIG. 11 is a diagram illustrating a model training module in which a latency model for a plurality of latency profiles is determined, according to an example embodiment.
Figure 12:
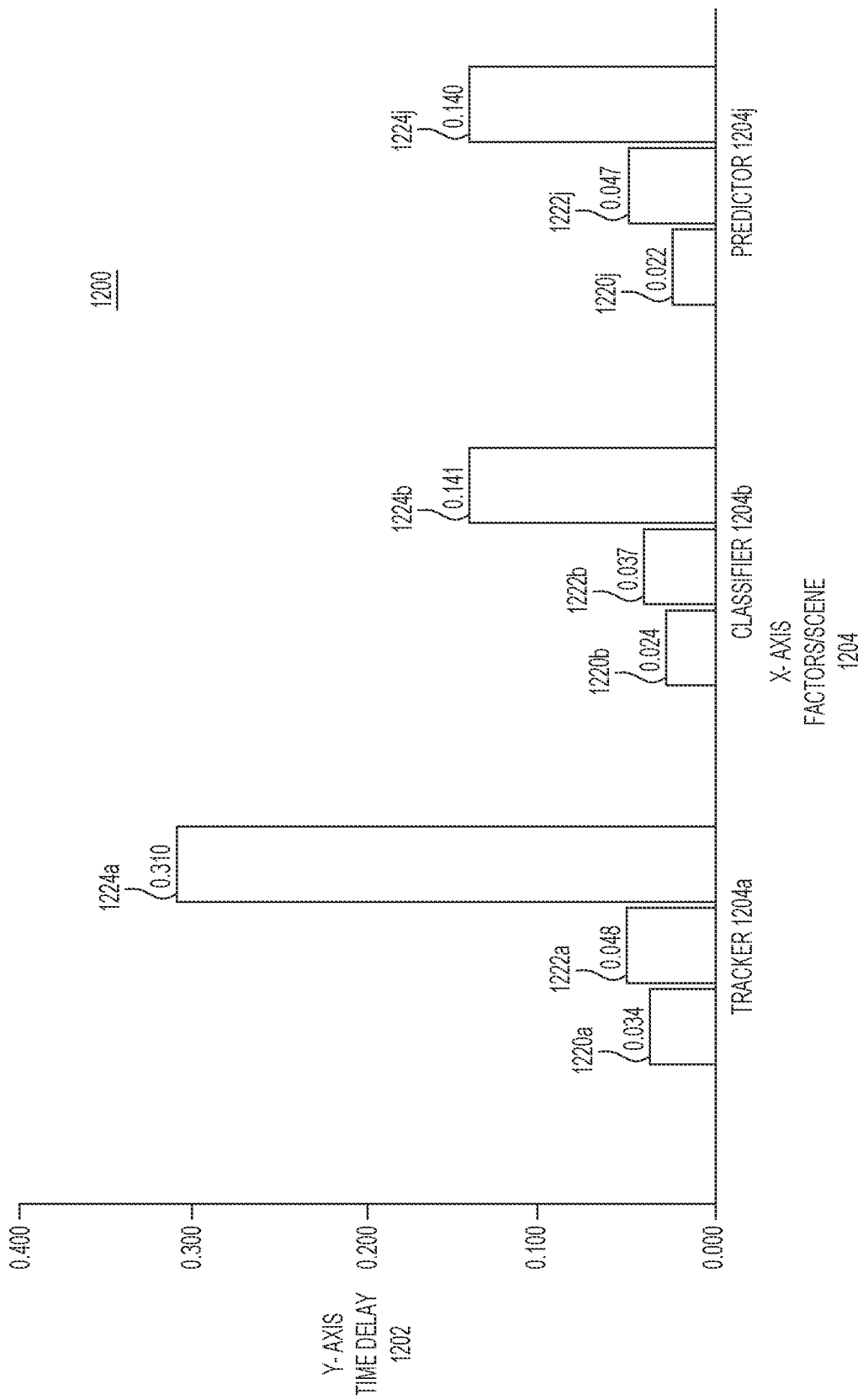
FIG. 12 is a view illustrating a comparison between scene-based latency using the latency model, simulation latency, and maximum latency amounts, according to an example embodiment.

With continued reference to FIG. 10, FIG. 11 is a diagram illustrating the model training module 1020 in which a latency model for a plurality of latency profiles is determined, according to an example embodiment. The model training module 1020 involves a machine learning stage 1102, an evaluation stage 1104, and a tuning stage 1106.

The model training module 1020 obtains a plurality of feature/latency pairs from the data generation pipeline 1010 of FIG. 10, collectively referred to as "training scene set". The training scene set is input into the machine learning (ML) stage 1102.

In the ML stage 1102, features are selected and preprocessed along with corresponding latencies. Model training may involve one or more supervised approaches, a Lasso model that accounts for overfitting and provides computational efficiencies, tree-based ensemble models, neural networks, etc. Based on performing the ML stage 1102, a plurality of models for generating latency profiles are utilized. In one example, a Lasso model may be selected for generating a latency profile for each component of the autonomous driving system. In another example embodiment, a plurality of models may be selected for generating various latency profiles for various components of the autonomous driving system such as an ensemble model for a perception latency profile to determine latency amounts for perceptions/tracks and a Lasso model for a trajectory latency profile to determine latency amounts for trajectory computations. In yet another example embodiment, one ML model may be selected and utilized to generate a plurality of latency profiles such as a trajectory latency profile, a tracking latency profile, a perception latency profile, etc.

At the evaluation stage 1104, the plurality of models (for generating various latency profiles) are analyzed based on a performance metric such as comparisons with actual simulations by the HIL 1014 of FIG. 10, distribution checks, feature similarities, etc. Based on the evaluation stage 1104, one or more latency models for determining a latency amount is selected.

The selected latency model(s) is further improved in the tuning stage 1106. The tuning stage 1106 involves updating parameters of the latency model using machine learning and/or additional simulations. One or more latency models 1110 for generating various latency profiles of various components of the autonomous driving system (with or without the teleoperations system) are provided to the latency arrangement 1034 of FIG. 10. The one or more latency models 1110 are equipped to accurately estimated latency based on a set of factors determined from the simulation data. The set of factors determine difficulty of the processing to be performed by the autonomous driving system to operate the vehicle.

With continued reference to FIGS. 9-11, FIG. 12 is a view illustrating a comparison 1200 between scene-based latency using the latency models 1110, simulation latency, and maximum latency amounts, according to an example embodiment. The x-axis indicates factors or elements 1204 in the scene and y-axis indicates time delay 1202 i.e., latency amount.

The factors or elements 1204 are representative of different types of processing to be performed by the autonomous driving system such as, but not limited to, compute load of a tracker 1204a (sensing various tracks), a classifier 1204b (identifying or categorizing various tracks), and a predictor 1204j (computing a possible trajectory based on identified track).

The time delay 1202 is represented as a root mean square deviation (RMSE). The RMSE is square root of the differences between the predicted values and observed values to evaluate the model accuracy such that the lower the metric (y value), the higher the accuracy.

In the comparison 1200, the scene-based latency amounts 1220a-j are determined using the latency models 1110 such as a scene-based tracker latency amount 1220a, a scene-based classifier latency amount 1220b, and a scene-based predictor latency amount 1220j. The processing latencies 1220a-j approximately correspond to actual processing latency amounts 1222a-j obtained during an actual simulation performed by HIL, for example, such as actual tracker latency amount 1222a, actual classifier latency amount 1222b, and actual predictor latency amount 1222j. The maximum latency amounts 1224a-1224cj (constant values "N") are substantially higher than the scene-based classifier latency amounts as shown in the comparison 1200 as maximum tracker latency amount 1224a, maximum classifier latency amount 1224b, and maximum predictor latency amount 1224j.

In one or more example embodiments, the one or more latency models 1110 that includes various latency profiles for various components of the autonomous driving system such as critical autonomy topics in a simulation approximately match measured end-to-end latency by the HIL and/or on the road. The one or more latency models 1110 provides a more realistic latency trajectories for simulation data.

Figure 13:
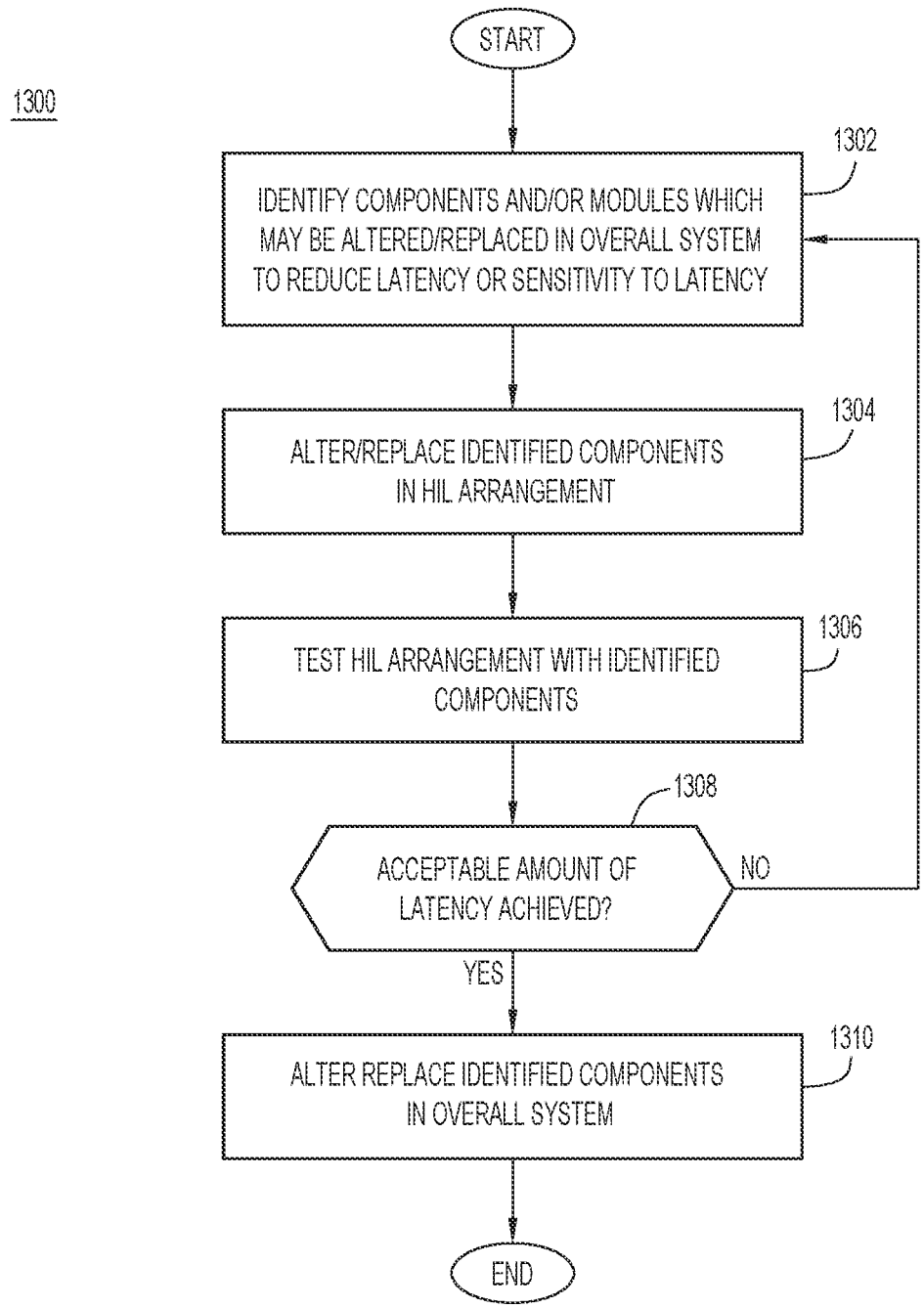
FIG. 13 is a flow chart illustrating a mitigating method in which latency is reduced by modifying one or more components of the autonomous driving system, according to an example embodiment.

FIG. 13 is a flow chart illustrating a mitigating method 1300 in which latency is reduced by modifying the one or more components of the autonomous driving system, according to an example embodiment. The mitigating method 1300 may be executed by an engineer and/or a computing device such as the computing device 1600. The mitigating method 1300 is one example of the operation 710 of FIG. 7 in which one or more latency amounts are reduced to validate the autonomous driving system.

The mitigating method 1300 of mitigating latency issues begins at 1302, by identifying components and/or modules in an overall system, e.g., a vehicle, which may be altered, replaced, removed, and/or added to potentially reduce latency or sensitivity to latency within the overall system. That is, changes which may be made within the overall system to reduce latency or sensitivity to latency without significantly compromising the performance of the overall system are identified. Identifying changes may include, but is not limited to including, researching specifications of components or modules, testing components or modules, and/or redesigning components or modules. In one example embodiment, when the autonomous driving system involves a remotely located teleoperations system, a computing device may identify other networks available for communicating with the vehicle and switch to a faster network.

The mitigating method 1300 further involves at 1304, altering or replacing the identified components in the HIL arrangement. As previously mentioned, a HIL arrangement is generally a representation of an overall system, as for example an autonomous vehicle. Once components or modules are altered, replaced, removed, and/or added to the HIL arrangement, the HIL arrangement is tested or assessed at 1306. Testing the HIL arrangement may include obtaining latency information or profiles, as well as obtaining information relating to changes in performance due to the implemented changes.

The mitigating method 1300 further involves at 1308, determining whether an acceptable or desired amount of latency is achieved by the alterations, replacements, removals, and/or additions. That is, it is determine whether an amount of latency identified when running a simulations may be achieved by the updated implementation of the HIL arrangement. If it is determined at 1308 that an acceptable amount of latency is not achieved, the mitigating method 1300 returns to 1302 in which new or different components or modules are identified which may be altered, replaced, removed, and/or added to try and achieve a desired amount of latency.

Alternatively, if the determination is made at 1308 that the acceptable amount of latency is achieved by the alterations, replacements, removals, and/or additions implemented in the HIL arrangement, the indication is that implementing the changes in an overall system, e.g., a vehicle, would meet safety standards. As such, from 1308, the mitigating method 1300 proceeds to 1310 in which the components identified at 1302 are altered, replaced, removed, and/or added to the overall system, and the mitigating method 1300 of mitigating latency issues is completed.

Figure 14:
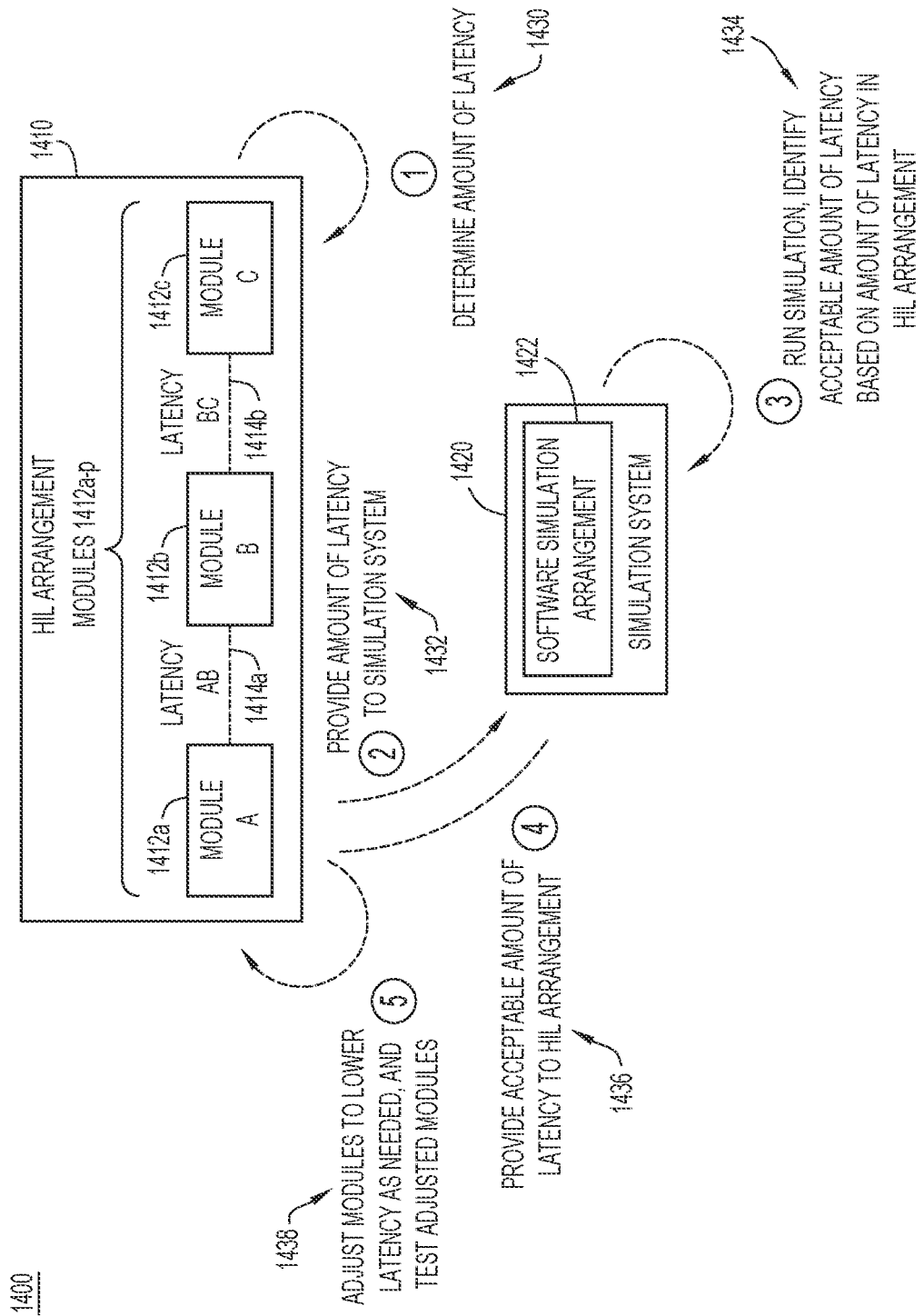
FIG. 14 is a diagram illustrating a platform which enables latencies associated with the operation of a vehicle to be assessed and modified, according to an example embodiment.

Referring next to FIG. 14, FIG. 14 is a diagram illustrating a platform 1400, which enables latencies associated with the operation of an overall system, e.g., a vehicle, to be assessed and modified, according to an example embodiment. The platform 1400 includes a HIL arrangement 1410 such as the HIL arrangement 660 of FIG. 6B or the HIL 1014 of FIG. 10 and a simulation system 1420 that includes a software simulation arrangement 1422 such as the software simulation arrangement 610 of FIGS. 6A and 6B or the software simulation arrangement 1030 of FIG. 10.

The HIL arrangement 1410 may include substantially the same hardware and/or software systems as included on an associated vehicle (not shown). The HIL arrangement 1410 includes a plurality of modules 1412a-p. For example, as shown, a first module A 1412a may exchange information with the second module B 1412b, and the exchange of information may have a first latency amount 1414a (latency AB). Also, as shown, the second module B 1412b may exchange information with a third module C 1412c, and the exchange of information may have a second latency amount 1414b (latency BC).

At a time t1 1430, an approximately amount of latency associated with HIL arrangement 1410 may be estimated or otherwise determined. In one example embodiment, the approximate latency amount may be scene-based latency amount. In yet another example embodiment, the approximate latency amount may be maximum latency amount. For example, the latency amount be determined as a sum or aggregate of multiple latencies associated with the HIL arrangement 1410, e.g., a sum of the first latency amount 1414a and the second latency amount 1414b.

At a time t2 1432, the approximate amount of latency associated with HIL arrangement 1410 is provided to the simulation system 1420. The approximately amount of latency is provided to enable the software simulation to be run based on the approximate amount of latency by the software simulation arrangement 1422 such that an assessment may be made as to whether a system, e.g., a vehicle, may operate safely with that amount of latency.

At a time t3 1434, a simulation is run by simulation system 1420 to determine whether the approximately amount of latency is acceptable and, if not, to identify an acceptable amount of latency. The acceptable amount of latency is provided to HIL arrangement 1410 at a time t4 1436, or to a system (not shown) that is in communication with HIL arrangement 1410.

Based on the acceptable amount of latency, adjustments may be made at a time t5 1438 to one or more of the plurality modules 1412a-p to allow HIL arrangement 1410 to provide an amount of latency that is approximately equal to or less than the acceptable amount of latency. The adjustments may include changes or alterations, replacement, removals, and/or additions. Once the adjustments are made, HIL arrangement 1410 may execute tests to determine a new amount of latency based on the adjustments.

Figure 15:
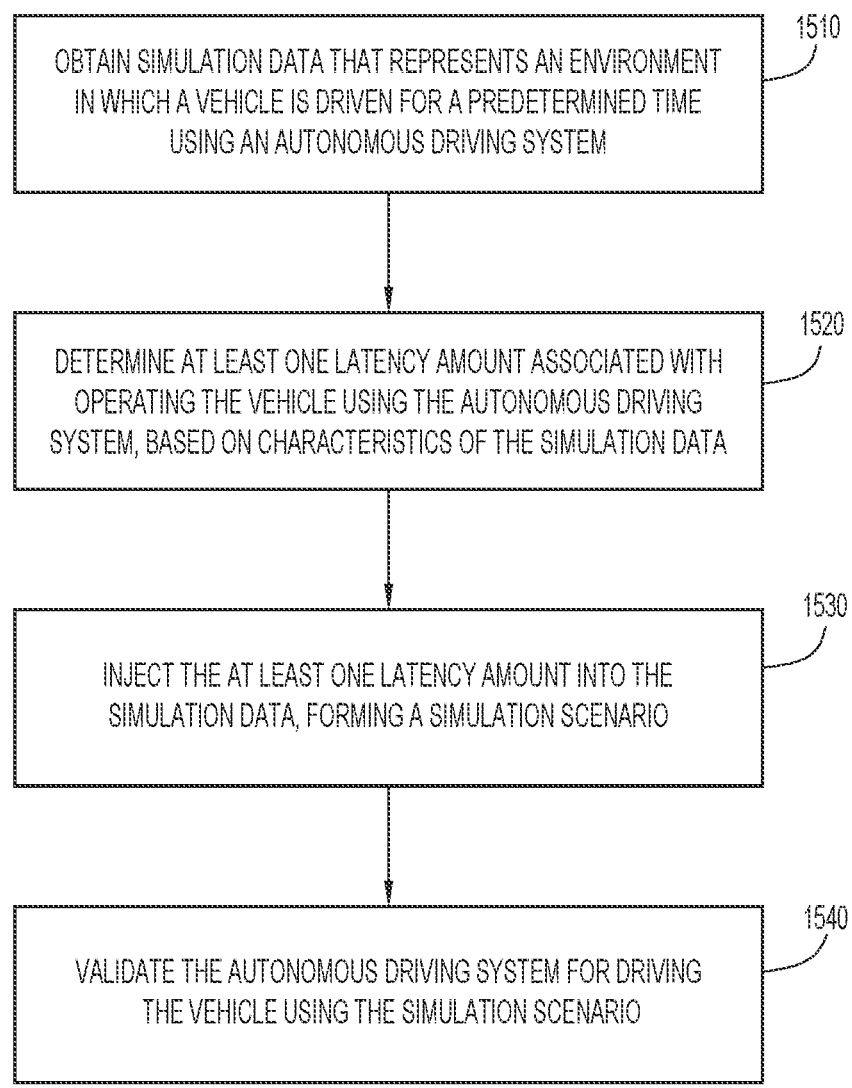
FIG. 15 is a flow chart depicting, at a high-level, operations of validating an autonomous driving system for driving an autonomous vehicle using a simulation scenario, according to an example embodiment.

FIG. 15 is a flow chart depicting a method 1500 of validating an autonomous driving system for driving an autonomous vehicle using a simulation scenario, according to one example embodiment. The method 1500 may be performed by a computing device such as a computing device 1600 of FIG. 16, detailed below.

The method 1500 begins at 1510, in which a computing device obtains simulation data that represents an environment in which a vehicle is driven for a predetermined time using an autonomous driving system.

The method 1500 further involves, at 1520, the computing device determining at least one latency amount associated with operating the vehicle using the autonomous driving system, based on characteristics of the simulation data.

The method 1500 further involves, at 1530, the computing device injecting the at least one latency amount into the simulation data, forming a simulation scenario and at 1540, the computing device validating the autonomous driving system for driving the vehicle using the simulation scenario.

In one or more example embodiments, the operation 1540 of validating the autonomous driving system may include determining whether the autonomous driving system is ready for deployment based on whether the autonomous driving system drives the vehicle through the simulation scenario without a collision.

In one instance, the at least one latency amount may include a delay time associated with exchanging data between one or more components of the autonomous driving system while driving the vehicle using the autonomous driving system.

In another instance, the at least one latency amount may include a network latency associated with communicating with a remotely located teleoperations system while the remotely located teleoperations system remotely drives the vehicle.

In one form, the operation 1520 of determining the at least one latency amount may include determining a perception delay associated with processing of sensed data obtained by one or more sensing components of the autonomous driving system while driving the vehicle. The operation 1520 of determining the at least one latency amount may further include determining a tracking delay associated with identifying one or more elements in the sensed data. The one or more elements in the sensed data may be related to one or more tracks present in the environment of the vehicle. The operation 1520 of determining the at least one latency amount may further include determining a computing delay associated with generating one or more trajectories for continuing to drive the vehicle without a collision based on the one or more elements.

According to one or more example embodiments, the operation 1520 of determining the at least one latency amount may further include aggregating the perception delay, the tracking delay, and the computing delay, to generate the at least one latency amount for the simulation scenario.

In another form, the operation 1520 of determining the at least one latency amount may further include generating, using a hardware-in-loop arrangement, at least one latency model for estimating different latency amounts based on different sets of features of the environment in which the vehicle is driven for the predetermined time. The operation 1520 of determining the at least one latency amount may further include selecting a latency profile that matches the characteristics of the simulation data based on the at least one latency model.

According to one or more example embodiments, the operation of generating the at least one latency model may include driving the vehicle using the autonomous driving system through a plurality of scenarios, where each scenario of the plurality of scenarios may represent a respective set of features from the different sets of features, to obtain a plurality of measured delays. The plurality of measured delays may represent a plurality of processing delays associated with operating the vehicle using the autonomous driving system in the plurality of scenarios. The operation of generating the at least one latency model may further include generating the at least one latency model using machine learning in which one of the plurality of measured delays is associated with the respective set of features.

Although only a few embodiments have been described in this disclosure, it should be understood that the disclosure may be embodied in many other specific forms without departing from the spirit or the scope of the present disclosure. By way of example, while latency measurements have been described as being obtained from a HIL arrangement, latency measures are not limited to being obtained from a HIL arrangement. Other suitable methods for obtaining latency measurements which may be injected into a simulation system include, but is not limited to including, obtaining latency measurements from actual autonomous vehicles and/or teleoperations systems.

A HIL arrangement has been described as providing an indication of a substantially maximum or substantially estimated amount of latency that is likely to be experienced in a system. The amount of latency indicated by the HIL arrangement is not limited to being approximately a maximum amount of latency or substantially estimated amount of latency. For instance, an amount of latency indicated by the HIL arrangement, and provided to a simulation system, may be a threshold amount of latency that may enable safety standards to be met. Further, an amount of latency that is injected into a simulation system is not limited to being provided by a HIL arrangement and may be provided using any suitable method.

An autonomous vehicle has generally been described as being arranged to be monitored and/or operated by a teleoperations system as needed. It should be understood that an autonomous vehicle may be arranged to operate substantially without a teleoperations system. That is, an autonomous vehicle is not limited to being part of an overall system that includes a teleoperations system.

As described above, latency may be introduced by sets of components or modules of an autonomous vehicle. The components or modules may be associated with one or more stages or steps of autonomously operating the vehicle. For instance, components may be associated with a perception system or a planning system of the vehicle. Latency, or a time delay, may relate to the perception system and/or the planning system and/or another component or module of the autonomous vehicle, without departing from the spirit or the scope of the disclosure.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 16:
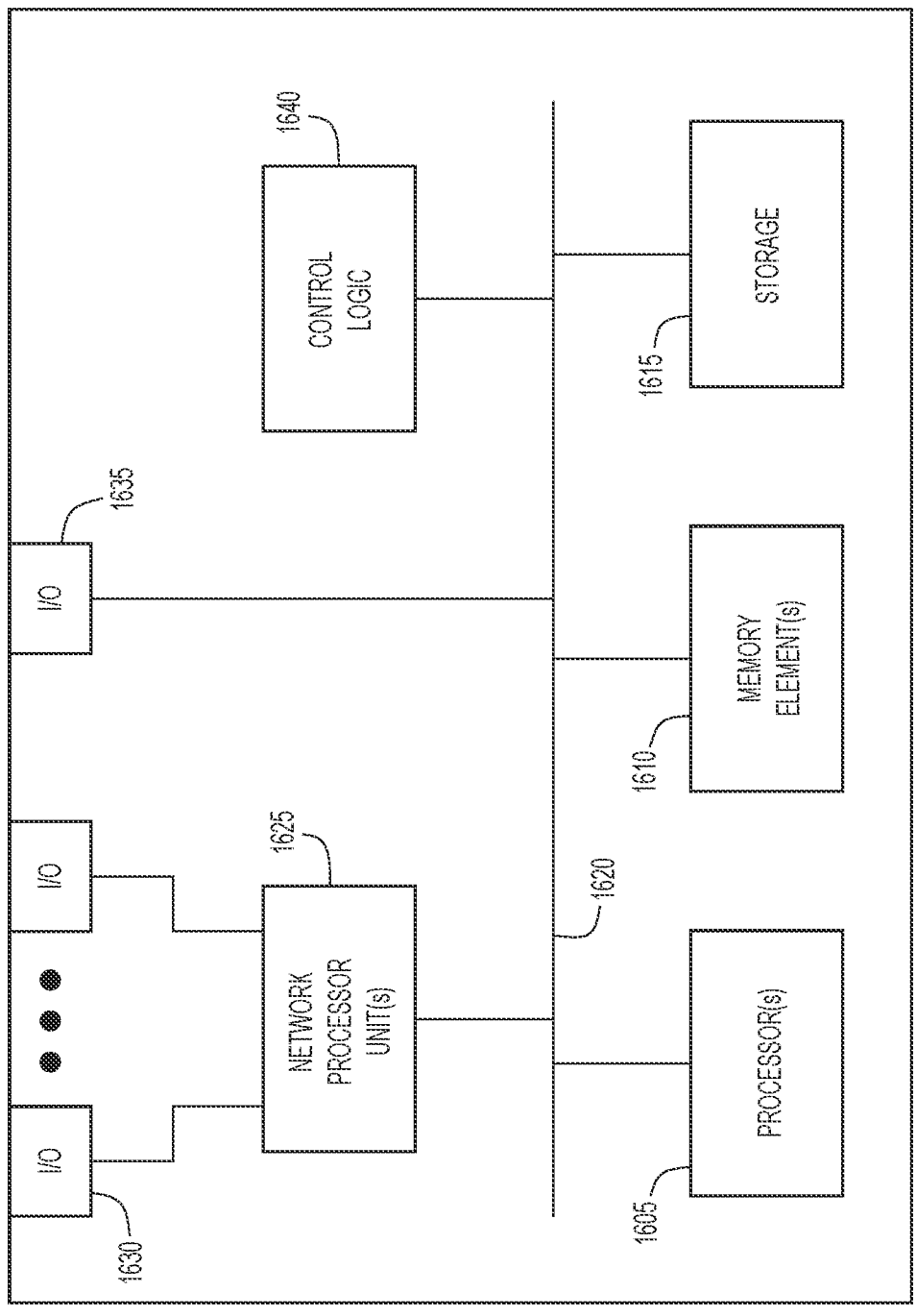
FIG. 16 is a block diagram of a computing device configured to perform functions associated with the techniques described herein and depicted in FIGS. 4-15, according to one or more example embodiments.

Referring now to FIG. 16, FIG. 16 illustrates a hardware block diagram of a computing device 1600 configured to perform functions associated with the techniques described herein and depicted in FIGS. 4-15, according to one or more example embodiments. The computing device 1600 may perform the functions of the autonomy system testing described in various example embodiments above.

In various example embodiments, a computing device, such as computing device 1600 or any combination of computing devices, may be configured as any entity/entities as discussed for the techniques depicted in connection with FIGS. 1-15 in order to perform operations of the various techniques discussed herein.

In at least one embodiment, computing device 1600 may include one or more processor(s) 1605, one or more memory element(s) 1610, storage 1615, a bus 1620, one or more network processor unit(s) 1625 interconnected with one or more network input/output (I/O) interface(s) 1630, one or more I/O interface(s) 1635, and control logic 1640. In various embodiments, instructions associated with logic for computing device 1600 can overlap in any manner and are not limited to the specific allocation of instructions and/or operations described herein.

In at least one embodiment, processor(s) 1605 is/are at least one hardware processor configured to execute various tasks, operations and/or functions for computing device 1600 as described herein according to software and/or instructions configured for computing device. Processor(s) 1605 (e.g., a hardware processor) can execute any type of instructions associated with data to achieve the operations detailed herein. In one example, processor(s) 1605 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1610 and/or storage 1615 is/are configured to store data, information, software, and/or instructions associated with computing device 1600, and/or logic configured for memory element(s) 1610 and/or storage 1615. For example, any logic described herein (e.g., control logic 1640) can, in various embodiments, be stored for computing device 1600 using any combination of memory element(s) 1610 and/or storage 1615. Note that in some embodiments, storage 1615 can be consolidated with memory element(s) 1610 (or vice versa), or can overlap/exist in any other suitable manner.

In at least one embodiment, bus 1620 can be configured as an interface that enables one or more elements of computing device 1600 to communicate in order to exchange information and/or data. Bus 1620 can be implemented with any architecture designed for passing control, data and/or information between processors, memory elements/storage, peripheral devices, and/or any other hardware and/or software components that may be configured for computing device 1600. In at least one embodiment, bus 1620 may be implemented as a fast kernel-hosted interconnect, potentially using shared memory between processes (e.g., logic), which can enable efficient communication paths between the processes.

In various embodiments, network processor unit(s) 1625 may enable communication between computing device 1600 and other systems, entities, etc., via network I/O interface(s) 1630 to facilitate operations discussed for various embodiments described herein. In various embodiments, network processor unit(s) 1625 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1630 can be configured as one or more Ethernet port(s), Fibre Channel ports, and/or any other I/O port(s) now known or hereafter developed. Thus, the network processor unit(s) 1625 and/or network I/O interfaces 1630 may include suitable interfaces for receiving, transmitting, and/or otherwise communicating data and/or information in a network environment.

I/O interface(s) 1635 allow for input and output of data and/or information with other entities that may be connected to the computing device 1600. For example, I/O interface(s) 1635 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1640 can include instructions that, when executed, cause processor(s) 1605 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1640) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1610 and/or storage 1615 can store data, software, code, instructions (e.g., processor instructions), logic, parameters, combinations thereof, and/or the like used for operations described herein. This includes memory element(s) 1610 and/or storage 1615 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, an apparatus is provided such as the computing device 1600 of FIG. 16. The apparatus includes a memory, a network interface configured to enable network communications, and a processor. The processor is configured to perform a method, which includes obtaining simulation data that represents an environment in which a vehicle is driven for a predetermined time using an autonomous driving system. The method further includes determining at least one latency amount associated with operating the vehicle using the autonomous driving system, based on characteristics of the simulation data and injecting the at least one latency amount into the simulation data, forming a simulation scenario. The method further includes validating the autonomous driving system for driving the vehicle using the simulation scenario.

In another form, one or more non-transitory computer readable storage media are provided encoded with instructions that, when executed by at least one processor, cause the processor to execute a method including obtaining simulation data that represents an environment in which a vehicle is driven for a predetermined time using an autonomous driving system. The method further includes determining at least one latency amount associated with operating the vehicle using the autonomous driving system, based on characteristics of the simulation data and injecting the at least one latency amount into the simulation data, forming a simulation scenario. The method further includes validating the autonomous driving system for driving the vehicle using the simulation scenario.

In yet another form, a system or systems are provided that include the components, modules, and operations explained above with reference to FIGS. 1-16.

The steps associated with the methods of the present disclosure may vary widely. Steps may be added, removed, altered, combined, and reordered without departing from the spirit of the scope of the present disclosure. By way of example, when changes made to an HIL arrangement are identified as allowing an acceptable or desired amount of latency to be achieved, as described above in various example embodiments, simulations may be run to further validate that the changes enable safety standards to be met before the changes are made to an overall system such as a vehicle. Therefore, the present examples are to be considered as illustrative and not restrictive, and the examples are not to be limited to the details given herein, but may be modified within the scope of the appended claims.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a computing device, simulation data that represents an environment in which a vehicle is driven for a predetermined time using an autonomous driving system;
   determining, by the computing device, at least one latency amount associated with operating the vehicle using the autonomous driving system, based on characteristics of the simulation data;
   injecting, by the computing device, the at least one latency amount into the simulation data, forming a simulation scenario; and
   validating, by the computing device, the autonomous driving system for driving the vehicle using the simulation scenario including:
      determining whether the at least one latency amount injected into the simulation data is acceptable based on whether the autonomous driving system drives the vehicle through the simulation scenario without a collision.

2. The method of claim 1, wherein validating the autonomous driving system includes:
   determining whether the autonomous driving system is ready for deployment based on whether the autonomous driving system drives the vehicle through the simulation scenario without the collision.

3. The method of claim 1, wherein the at least one latency amount includes a delay time associated with exchanging data between one or more components of the autonomous driving system while driving the vehicle using the autonomous driving system.

4. The method of claim 1, wherein the at least one latency amount includes a network latency associated with communicating with a remotely located teleoperations system while the remotely located teleoperations system remotely drives the vehicle.

5. The method of claim 1, wherein determining the at least one latency amount includes:
   determining a perception delay associated with processing of sensed data obtained by one or more sensing components of the autonomous driving system while driving the vehicle;
   determining a tracking delay associated with identifying one or more elements in the sensed data, the one or more elements in the sensed data related to one or more tracks present in the environment of the vehicle; and
   determining a computing delay associated with generating one or more trajectories for continuing to drive the vehicle without a collision based on the one or more elements.

6. The method of claim 5, wherein determining the at least one latency amount further includes:
   aggregating the perception delay, the tracking delay, and the computing delay to generate the at least one latency amount for the simulation scenario.

7. The method of claim 1, wherein determining the at least one latency amount includes:
   generating, using a hardware-in-loop arrangement, at least one latency model for estimating different latency amounts based on different sets of features of the environment in which the vehicle is driven for the predetermined time; and
   selecting a latency profile that matches the characteristics of the simulation data based on the at least one latency model.

8. The method of claim 7, wherein generating the at least one latency model includes:
   simulating driving of the vehicle using the autonomous driving system through a plurality of scenarios, each scenario of the plurality of scenarios representing a respective set of features from the different sets of features, to obtain a plurality of measured delays, wherein the plurality of measured delays represent a plurality of processing delays associated with operating the vehicle using the autonomous driving system in the plurality of scenarios; and
   generating the at least one latency model using machine learning in which one of the plurality of measured delays is associated with the respective set of features.

9. The method of claim 1, wherein injecting the at least one latency amount includes adding to the simulation data the at least one latency amount to generate the simulation scenario and further comprising:
   executing the simulation scenario using the autonomous driving system.

10. The method of claim 1, wherein validating the autonomous driving system involves:
    determining that the at least one latency amount is not acceptable to drive the autonomous driving system through the simulation scenario without the collision; and
    reducing the at least one latency amount based on determining that the at least one latency amount is not acceptable to drive the autonomous driving system through the simulation scenario without the collision.

11. An apparatus comprising:
    a memory;
    a network interface configured to enable network communications; and
    a processor, wherein the processor is configured to perform a method comprising:
       obtaining simulation data that represents an environment in which a vehicle is driven for a predetermined time using an autonomous driving system;
       determining at least one latency amount associated with operating the vehicle using the autonomous driving system, based on characteristics of the simulation data;
       injecting the at least one latency amount into the simulation data, forming a simulation scenario; and
       validating the autonomous driving system for driving the vehicle using the simulation scenario including:
          determining whether the at least one latency amount injected into the simulation data is acceptable based on whether the autonomous driving system drives the vehicle through the simulation scenario without a collision.

12. The apparatus of claim 11, wherein the processor is configured to validate the autonomous driving system by:
    determining whether the autonomous driving system is ready for deployment based on whether the autonomous driving system drives the vehicle through the simulation scenario without the collision.

13. The apparatus of claim 11, wherein the at least one latency amount includes a delay time associated with exchanging data between one or more components of the autonomous driving system while driving the vehicle using the autonomous driving system.

14. The apparatus of claim 11, wherein the at least one latency amount includes a network latency associated with communicating with a remotely located teleoperations system while the remotely located teleoperations system remotely drives the vehicle.

15. The apparatus of claim 11, wherein the processor is configured to determine the at least one latency amount by:
    determining a perception delay associated with processing of sensed data obtained by one or more sensing components of the autonomous driving system while driving the vehicle;
    determining a tracking delay associated with identifying one or more elements in the sensed data, the one or more elements in the sensed data related to one or more tracks present in the environment of the vehicle; and
    determining a computing delay associated with generating one or more trajectories for continuing to drive the vehicle without a collision based on the one or more elements.

16. The apparatus of claim 15, wherein the processor is further configured to determine the at least one latency amount by:
    aggregating the perception delay, the tracking delay, and the computing delay to generate the at least one latency amount for the simulation scenario.

17. The apparatus of claim 11, wherein the processor is further configured to determine the at least one latency amount by:
    generating, using a hardware-in-loop arrangement, at least one latency model for estimating different latency amounts based on different sets of features of the environment in which the vehicle is driven for the predetermined time; and
    selecting a latency profile that matches the characteristics of the simulation data based on the at least one latency model.

18. One or more non-transitory computer readable storage media encoded with instructions that, when executed by a processor, cause the processor to execute a method comprising:
    obtaining simulation data that represents an environment in which a vehicle is driven for a predetermined time using an autonomous driving system;
    determining at least one latency amount associated with operating the vehicle using the autonomous driving system, based on characteristics of the simulation data;
    injecting the at least one latency amount into the simulation data, forming a simulation scenario; and
    validating the autonomous driving system for driving the vehicle using the simulation scenario including:
        determining whether the at least one latency amount injected into the simulation data is acceptable based on whether the autonomous driving system drives the vehicle through the simulation scenario without a collision.

19. The one or more non-transitory computer readable storage media of claim 18, wherein validating the autonomous driving system includes:
    determining whether the autonomous driving system is ready for deployment based on whether the autonomous driving system drives the vehicle through the simulation scenario without the collision.

20. The one or more non-transitory computer readable storage media of claim 18, wherein the at least one latency amount includes a delay time associated with exchanging data between one or more components of the autonomous driving system while driving the vehicle using the autonomous driving system.

* * * * *